(12) United States Patent
Meylan et al.

(10) Patent No.: US 8,600,336 B2
(45) Date of Patent: Dec. 3, 2013

(54) SCHEDULING WITH REVERSE DIRECTION GRANT IN WIRELESS COMMUNICATION SYSTEMS

(75) Inventors: Arnaud Meylan, San Diego, CA (US); Sanjiv Nanda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1057 days.

(21) Appl. No.: 11/312,187

(22) Filed: Dec. 19, 2005

(65) Prior Publication Data
US 2007/0058605 A1    Mar. 15, 2007

Related U.S. Application Data

(60) Provisional application No. 60/716,449, filed on Sep. 12, 2005.

(51) Int. Cl.
*H04B 1/06*    (2006.01)
(52) U.S. Cl.
USPC ......... 455/346; 455/41.1; 455/41.2; 455/507; 370/329; 370/346
(58) Field of Classification Search
USPC ......... 455/343.2, 343.4, 346, 41.1, 41.2, 507; 370/329, 346, 449
See application file for complete search history.

(56) References Cited

U.S. PATENT DOCUMENTS

| | | | |
|---|---|---|---|
| 4,747,100 A | 5/1988 | Roach et al. | |
| 4,750,171 A | 6/1988 | Kedar et al. | |
| 5,081,623 A | 1/1992 | Ainscow et al. | |
| 5,133,081 A | 7/1992 | Mayo | |
| 5,276,703 A | 1/1994 | Budin et al. | |
| 5,280,476 A | 1/1994 | Kojima et al. | |
| 5,297,144 A | 3/1994 | Gilbert et al. | |
| 5,384,777 A | 1/1995 | Ahmadi et al. | |
| 5,444,702 A | 8/1995 | Burnett et al. | |
| 5,638,371 A | 6/1997 | Raychaudhuri et al. | |
| 5,677,909 A | 10/1997 | Heide et al. | |

(Continued)

FOREIGN PATENT DOCUMENTS

| CN | 1263675 | 8/2000 |
|---|---|---|
| CN | 1350733 | 5/2002 |

(Continued)

OTHER PUBLICATIONS

Syed Aon Mujtaba, "TGn synch proposal technical specification," IEEE P802.11 Wireless LANs, [online], May 13, 2005, pp. 1-134, Retirieve from Internet: URL: <www.ieee802.org/11/DocFiles/04/11-04-0889-05-00n-tgnsync-proposal-technical-specification.doc>, retrieved on Feb. 6, 2006.

(Continued)

*Primary Examiner* — Jinsong Hu
*Assistant Examiner* — Michael Nguyen
(74) *Attorney, Agent, or Firm* — Dmitry R. Milikovsky; Mary A. Fales

(57) ABSTRACT

Systems and methodologies are described that facilitate increased communication channel bandwidth efficiency in association with scheduled time periods that allocate channel access to particular stations. According to various aspects, systems and methods are described that facilitate providing and/or utilizing reverse direction grants in connection with scheduled channel access. Such systems and/or method can mitigate an amount of unused channel access time after a station completes data transmission prior to an end of the allocated period.

20 Claims, 13 Drawing Sheets

(56) References Cited

U.S. PATENT DOCUMENTS

| | | | |
|---|---|---|---|
| 5,684,791 A | 11/1997 | Raychaudhuri et al. |
| 5,719,868 A | 2/1998 | Young et al. |
| 5,729,542 A | 3/1998 | DuPont |
| 5,751,719 A | 5/1998 | Chen et al. |
| 5,818,842 A | 10/1998 | Burwell et al. |
| 5,923,650 A | 7/1999 | Chen et al. |
| 5,946,313 A | 8/1999 | Allan et al. |
| 5,970,059 A | 10/1999 | Ahopelto et al. |
| 5,974,045 A | 10/1999 | Ohkura et al. |
| 6,002,691 A | 12/1999 | Citta et al. |
| 6,014,087 A | 1/2000 | Krishnakumar et al. |
| 6,049,528 A | 4/2000 | Hendel et al. |
| 6,069,886 A | 5/2000 | Ayerst et al. |
| 6,098,142 A | 8/2000 | Leggett et al. |
| 6,111,927 A | 8/2000 | Sokoler |
| 6,130,886 A | 10/2000 | Ketseoglou et al. |
| 6,252,854 B1 | 6/2001 | Hortensius et al. |
| 6,256,317 B1 | 7/2001 | Holloway et al. |
| 6,307,846 B1 | 10/2001 | Willey |
| 6,404,751 B1 | 6/2002 | Roark et al. |
| 6,433,737 B2 | 8/2002 | Katz |
| 6,438,104 B1 | 8/2002 | Fodor et al. |
| 6,452,917 B1 | 9/2002 | Leung |
| 6,456,599 B1 | 9/2002 | Elliott et al. |
| 6,483,819 B1 | 11/2002 | Take et al. |
| 6,504,506 B1 | 1/2003 | Thomas et al. |
| 6,512,773 B1 | 1/2003 | Scott |
| 6,532,225 B1 | 3/2003 | Chang et al. |
| 6,542,490 B1 | 4/2003 | Ahmadvand et al. |
| 6,553,020 B1 | 4/2003 | Hughes et al. |
| 6,563,816 B1 | 5/2003 | Nodoushani et al. |
| 6,574,237 B1 | 6/2003 | Bullman et al. |
| 6,580,704 B1 | 6/2003 | Wellig et al. |
| 6,587,441 B1 | 7/2003 | Urban et al. |
| 6,600,754 B1 | 7/2003 | Young et al. |
| 6,611,525 B1 | 8/2003 | Natanson et al. |
| 6,611,529 B1 | 8/2003 | Krishnakumar et al. |
| 6,621,805 B1 | 9/2003 | Kondylis et al. |
| 6,621,827 B1 | 9/2003 | Rezvani et al. |
| 6,625,171 B1 | 9/2003 | Matsudo |
| 6,633,564 B1 | 10/2003 | Steer et al. |
| 6,643,260 B1 | 11/2003 | Kloth et al. |
| 6,671,511 B1 | 12/2003 | Forssell et al. |
| 6,724,740 B1 | 4/2004 | Choi et al. |
| 6,741,635 B2 | 5/2004 | Lo et al. |
| 6,751,187 B2 | 6/2004 | Walton et al. |
| 6,751,623 B1 | 6/2004 | Basso et al. |
| 6,760,388 B2 | 7/2004 | Ketchum et al. |
| 6,768,730 B1 | 7/2004 | Whitehill |
| 6,771,706 B2 | 8/2004 | Ling et al. |
| 6,788,702 B1 | 9/2004 | Garcia-Luna-Aceves et al. |
| 6,791,962 B2 | 9/2004 | Wentink |
| 6,791,996 B1 | 9/2004 | Watanabe et al. |
| 6,795,409 B1 | 9/2004 | Youssefmir et al. |
| 6,795,418 B2 | 9/2004 | Choi et al. |
| 6,795,419 B2 | 9/2004 | Paratainen |
| 6,813,260 B1 | 11/2004 | Fogle |
| 6,847,626 B1 | 1/2005 | Carneal et al. |
| 6,868,133 B2 | 3/2005 | Hicks et al. |
| 6,898,441 B1 | 5/2005 | Kogiantis et al. |
| 6,907,020 B2 | 6/2005 | Periyalwar et al. |
| 6,912,225 B1 | 6/2005 | Kohzuki et al. |
| 6,934,275 B1 | 8/2005 | Love et al. |
| 6,944,688 B1 | 9/2005 | Batcher |
| 6,961,311 B2 | 11/2005 | Rakotoarivelo et al. |
| 6,963,549 B1 | 11/2005 | Jayaraman et al. |
| 6,977,944 B2 | 12/2005 | Brockmann et al. |
| 7,006,500 B1 | 2/2006 | Pedersen et al. |
| 7,006,848 B2 | 2/2006 | Ling et al. |
| 7,031,274 B2 | 4/2006 | Sherman |
| 7,031,287 B1 | 4/2006 | Ho et al. |
| 7,046,639 B2 | 5/2006 | Garcia-Luna-Aceves et al. |
| 7,046,654 B2 | 5/2006 | Chen |
| 7,046,690 B2 | 5/2006 | Sherman |
| 7,058,074 B2 | 6/2006 | Ho et al. |
| 7,065,144 B2 | 6/2006 | Walton et al. |
| 7,068,633 B1 | 6/2006 | Ho |
| 7,079,552 B2 | 7/2006 | Cain et al. |
| 7,082,117 B2 | 7/2006 | Billhartz |
| 7,085,281 B2 | 8/2006 | Thomas et al. |
| 7,092,737 B2 | 8/2006 | Horng et al. |
| 7,095,732 B2 | 8/2006 | Watson, Jr. et al. |
| 7,099,300 B2 | 8/2006 | Sugaya |
| 7,099,671 B2 | 8/2006 | Liang |
| 7,116,652 B2 | 10/2006 | Lozano |
| 7,123,627 B2 | 10/2006 | Kowalski et al. |
| 7,130,289 B2 | 10/2006 | Kuan et al. |
| 7,142,527 B2 | 11/2006 | Garcia-Luna-Aceves et al. |
| 7,145,895 B2 | 12/2006 | Mueckenheim et al. |
| 7,149,245 B2 | 12/2006 | Budka et al. |
| 7,154,876 B2 | 12/2006 | Benveniste |
| 7,158,504 B2 | 1/2007 | Kadaba et al. |
| 7,158,803 B1 | 1/2007 | Elliott |
| 7,187,691 B2 | 3/2007 | Gavette et al. |
| 7,203,192 B2 | 4/2007 | Desai et al. |
| 7,206,083 B2 | 4/2007 | Shimada |
| 7,236,459 B1 | 6/2007 | Okholm et al. |
| 7,237,036 B2 | 6/2007 | Boucher et al. |
| 7,260,073 B2 | 8/2007 | Sipola |
| 7,263,083 B2 | 8/2007 | Kisigami et al. |
| 7,266,087 B2 | 9/2007 | Wahl et al. |
| 7,269,152 B2 | 9/2007 | Vukovic et al. |
| 7,274,707 B2 | 9/2007 | Choi et al. |
| 7,277,149 B2 | 10/2007 | Kim et al. |
| 7,277,419 B2 | 10/2007 | McGowan |
| 7,277,430 B2 | 10/2007 | Ono et al. |
| 7,280,513 B2 | 10/2007 | Cao et al. |
| 7,284,260 B2 | 10/2007 | Hilts et al. |
| 7,301,924 B1 | 11/2007 | Gurbuz et al. |
| 7,301,944 B1 | 11/2007 | Redmond |
| 7,313,104 B1 | 12/2007 | Kern et al. |
| 7,330,877 B2 * | 2/2008 | Kandala .................. 709/206 |
| 7,333,556 B2 | 2/2008 | Maltsev et al. |
| 7,336,642 B2 | 2/2008 | Rich et al. |
| 7,342,940 B2 | 3/2008 | Park |
| 7,366,202 B2 | 4/2008 | Scherzer et al. |
| 7,372,855 B2 | 5/2008 | Kandala |
| 7,400,641 B2 | 7/2008 | Nitschke et al. |
| 7,400,642 B2 | 7/2008 | Koo et al. |
| 7,417,974 B2 | 8/2008 | Hansen et al. |
| 7,440,573 B2 | 10/2008 | Lor et al. |
| 7,450,550 B2 | 11/2008 | Jin |
| 7,512,070 B2 | 3/2009 | Stephens |
| 7,525,994 B2 | 4/2009 | Scholte |
| 7,564,814 B2 | 7/2009 | Abraham et al. |
| 7,570,656 B2 | 8/2009 | Raphaeli et al. |
| 7,599,340 B2 | 10/2009 | Chandra et al. |
| 7,633,946 B2 | 12/2009 | Pavon et al. |
| 7,639,657 B1 | 12/2009 | Ho et al. |
| 7,676,236 B2 | 3/2010 | Nanda et al. |
| 7,706,399 B2 | 4/2010 | Janczak |
| 7,724,721 B2 | 5/2010 | Lim et al. |
| 7,818,018 B2 | 10/2010 | Nanda et al. |
| 7,869,432 B1 | 1/2011 | Mollyn |
| 7,881,340 B2 | 2/2011 | Farrag et al. |
| 8,401,018 B2 | 3/2013 | Meylan et al. |
| 2001/0024173 A1 | 9/2001 | Katz et al. |
| 2001/0046220 A1 | 11/2001 | Koo et al. |
| 2001/0053141 A1 | 12/2001 | Periyalwar et al. |
| 2001/0053695 A1 | 12/2001 | Wallentin |
| 2002/0009999 A1 | 1/2002 | Lee et al. |
| 2002/0021698 A1 | 2/2002 | Lee et al. |
| 2002/0022483 A1 | 2/2002 | Thompson et al. |
| 2002/0046257 A1 | 4/2002 | Killmer et al. |
| 2002/0067736 A1 | 6/2002 | Garcia-Luna-Aceves et al. |
| 2002/0071413 A1 | 6/2002 | Choi et al. |
| 2002/0071449 A1 | 6/2002 | Ho et al. |
| 2002/0093929 A1 | 7/2002 | Mangold et al. |
| 2002/0110101 A1 | 8/2002 | Gopalakrishnan et al. |
| 2002/0143982 A1 * | 10/2002 | Kandala .................. 709/236 |
| 2002/0172186 A1 | 11/2002 | Larsson |
| 2002/0172217 A1 | 11/2002 | Kadaba et al. |
| 2002/0174219 A1 | 11/2002 | Mei et al. |
| 2002/0191703 A1 | 12/2002 | Ling et al. |

(56) References Cited

U.S. PATENT DOCUMENTS

| | | |
|---|---|---|
| 2003/0002605 A1 | 1/2003 | Lo et al. |
| 2003/0003880 A1 | 1/2003 | Ling et al. |
| 2003/0015611 A1 | 1/2003 | Teng et al. |
| 2003/0043732 A1 | 3/2003 | Walton et al. |
| 2003/0050084 A1 | 3/2003 | Damnjanovic et al. |
| 2003/0060207 A1 | 3/2003 | Sugaya et al. |
| 2003/0063563 A1 | 4/2003 | Kowalski et al. |
| 2003/0072280 A1 | 4/2003 | McFarland et al. |
| 2003/0076797 A1 | 4/2003 | Lozano et al. |
| 2003/0087605 A1 | 5/2003 | Das et al. |
| 2003/0108117 A1 | 6/2003 | Ketchum et al. |
| 2003/0125040 A1 | 7/2003 | Walton et al. |
| 2003/0128684 A1 | 7/2003 | Hirsch et al. |
| 2003/0133441 A1 | 7/2003 | Watanabe et al. |
| 2003/0147385 A1 | 8/2003 | Montalvo et al. |
| 2003/0162519 A1 | 8/2003 | Smith et al. |
| 2003/0169697 A1 | 9/2003 | Suzuki et al. |
| 2003/0169763 A1 | 9/2003 | Choi et al. |
| 2003/0174645 A1 | 9/2003 | Paratainen et al. |
| 2003/0174680 A1 | 9/2003 | Kuan et al. |
| 2003/0198312 A1 | 10/2003 | Budka et al. |
| 2003/0202574 A1 | 10/2003 | Budka et al. |
| 2003/0223365 A1 | 12/2003 | Kowalski |
| 2003/0223418 A1 | 12/2003 | Desai et al. |
| 2004/0017823 A1 | 1/2004 | Kim et al. |
| 2004/0022213 A1 | 2/2004 | Choi et al. |
| 2004/0042556 A1 | 3/2004 | Medvedev et al. |
| 2004/0047319 A1 | 3/2004 | Elg |
| 2004/0063455 A1 | 4/2004 | Eran et al. |
| 2004/0082356 A1 | 4/2004 | Walton et al. |
| 2004/0105386 A1 | 6/2004 | Sipola et al. |
| 2004/0109433 A1 | 6/2004 | Khan |
| 2004/0120349 A1 | 6/2004 | Border et al. |
| 2004/0125778 A1 | 7/2004 | Lin et al. |
| 2004/0131019 A1 | 7/2004 | Kandala et al. |
| 2004/0141522 A1 | 7/2004 | Texerman et al. |
| 2004/0151199 A1 | 8/2004 | Sykes et al. |
| 2004/0156345 A1 | 8/2004 | Steer et al. |
| 2004/0156367 A1 | 8/2004 | Albuquerque et al. |
| 2004/0163129 A1 | 8/2004 | Chapman et al. |
| 2004/0184567 A1 | 9/2004 | McDonough et al. |
| 2004/0204101 A1 | 10/2004 | Qiu et al. |
| 2004/0204104 A1 | 10/2004 | Horng et al. |
| 2004/0246934 A1 | 12/2004 | Kim |
| 2004/0252664 A1 | 12/2004 | Cao et al. |
| 2004/0258039 A1 | 12/2004 | Stephens et al. |
| 2004/0258091 A1 | 12/2004 | Meyer et al. |
| 2004/0264504 A1 | 12/2004 | Jin et al. |
| 2004/0266451 A1 | 12/2004 | Stolyar et al. |
| 2005/0036475 A1 | 2/2005 | Nishiyama et al. |
| 2005/0047429 A1 | 3/2005 | Koo et al. |
| 2005/0053003 A1 | 3/2005 | Cain et al. |
| 2005/0053064 A1 | 3/2005 | Wang |
| 2005/0058078 A1 | 3/2005 | Jung et al. |
| 2005/0111462 A1 | 5/2005 | Walton et al. |
| 2005/0135284 A1 | 6/2005 | Nanda et al. |
| 2005/0135291 A1 | 6/2005 | Ketchum et al. |
| 2005/0135295 A1 | 6/2005 | Walton et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0152314 A1 | 7/2005 | Sun et al. |
| 2005/0152465 A1 | 7/2005 | Maltsev et al. |
| 2005/0157729 A1 | 7/2005 | Rabie et al. |
| 2005/0239407 A1 | 10/2005 | Foore et al. |
| 2005/0270975 A1 | 12/2005 | Meylan et al. |
| 2006/0052088 A1 | 3/2006 | Pavon et al. |
| 2006/0092871 A1* | 5/2006 | Nishibayashi et al. ........ 370/328 |
| 2006/0099956 A1 | 5/2006 | Harada et al. |
| 2006/0159123 A1 | 7/2006 | Fleury et al. |
| 2006/0164969 A1 | 7/2006 | Malik et al. |
| 2006/0165021 A1 | 7/2006 | Tian et al. |
| 2006/0165036 A1* | 7/2006 | Chandra et al. ............... 370/329 |
| 2006/0193294 A1 | 8/2006 | Jorswieck et al. |
| 2006/0227801 A1 | 10/2006 | Nanda et al. |
| 2006/0268886 A1* | 11/2006 | Sammour et al. ............. 370/394 |
| 2006/0274844 A1 | 12/2006 | Walton et al. |
| 2007/0037548 A1* | 2/2007 | Sammour et al. .......... 455/343.2 |
| 2007/0037564 A1 | 2/2007 | Imamura et al. |
| 2007/0058543 A1 | 3/2007 | Fenart et al. |
| 2007/0097945 A1 | 5/2007 | Wang et al. |
| 2007/0230338 A1 | 10/2007 | Shao et al. |
| 2008/0130660 A1 | 6/2008 | Ros-Giralt et al. |
| 2008/0267123 A1 | 10/2008 | Zeira et al. |
| 2009/0097444 A1 | 4/2009 | Lohr et al. |
| 2009/0103558 A1 | 4/2009 | Zangi et al. |
| 2009/0116434 A1 | 5/2009 | Lohr et al. |
| 2009/0252145 A1 | 10/2009 | Meylan et al. |
| 2009/0290655 A1 | 11/2009 | Abraham et al. |
| 2009/0323646 A1 | 12/2009 | Ketchum et al. |
| 2010/0246603 A1 | 9/2010 | Rabie et al. |
| 2010/0290423 A1 | 11/2010 | Hwang et al. |
| 2010/0309872 A1 | 12/2010 | Amini et al. |
| 2011/0182231 A1 | 7/2011 | Wang et al. |
| 2011/0223952 A1 | 9/2011 | Nanda et al. |
| 2012/0188973 A1 | 7/2012 | Meylan et al. |
| 2012/0263137 A1 | 10/2012 | Walton et al. |
| 2012/0287856 A1 | 11/2012 | Ketchum et al. |
| 2013/0034076 A1 | 2/2013 | Ketchum et al. |
| 2013/0070715 A1 | 3/2013 | Nanda et al. |

FOREIGN PATENT DOCUMENTS

| | | |
|---|---|---|
| EP | 0475682 | 3/1992 |
| EP | 0782360 A2 | 7/1997 |
| EP | 0912016 A2 | 4/1999 |
| EP | 1052855 | 11/2000 |
| EP | 1089500 | 4/2001 |
| EP | 1182900 | 2/2002 |
| EP | 1187406 A1 | 3/2002 |
| EP | 1261183 | 11/2002 |
| EP | 1317110 | 6/2003 |
| EP | 1463217 A | 9/2004 |
| JP | 2226828 | 10/1990 |
| JP | 2000174820 A | 6/2000 |
| JP | 2001024573 A | 1/2001 |
| JP | 2001160813 A | 6/2001 |
| JP | 2001160843 A | 6/2001 |
| JP | 2001507907 T | 6/2001 |
| JP | 2001217768 A | 8/2001 |
| JP | 2001522211 | 11/2001 |
| JP | 2003060564 A | 2/2003 |
| JP | 2003060655 A | 2/2003 |
| JP | 2003078565 | 3/2003 |
| JP | 2003143644 A | 5/2003 |
| JP | 2003163669 A | 6/2003 |
| JP | 2003249939 A | 9/2003 |
| JP | 2003258807 A | 9/2003 |
| JP | 2003528507 A | 9/2003 |
| JP | 2003289309 A | 10/2003 |
| JP | 2003289576 A | 10/2003 |
| JP | 2005020163 A | 1/2005 |
| JP | 2005505148 T | 2/2005 |
| JP | 2005057373 A | 3/2005 |
| JP | 2005094156 A | 4/2005 |
| KR | 2003-0036847 | 5/2003 |
| KR | 20040076979 A | 9/2004 |
| KR | 2006-0090258 | 8/2006 |
| KR | 2006-0090259 | 8/2006 |
| TW | 550926 B | 9/2003 |
| TW | 200304292 | 9/2003 |
| TW | 567731 B | 12/2003 |
| TW | 200401549 | 1/2004 |
| WO | WO9625811 A1 | 8/1996 |
| WO | 9905881 | 2/1999 |
| WO | WO9905881 A1 | 2/1999 |
| WO | WO9957931 A1 | 11/1999 |
| WO | 0056113 | 9/2000 |
| WO | WO0052880 A2 | 9/2000 |
| WO | WO0064111 A1 | 10/2000 |
| WO | WO0119032 A1 | 3/2001 |
| WO | WO0128170 A2 | 4/2001 |
| WO | WO0171928 A2 | 9/2001 |
| WO | WO0172081 | 9/2001 |

(56) References Cited

FOREIGN PATENT DOCUMENTS

| WO | 0176110 | 10/2001 |
|---|---|---|
| WO | 0201732 A2 | 1/2002 |
| WO | WO0213440 A2 | 2/2002 |
| WO | 0228119 | 4/2002 |
| WO | 0233852 | 4/2002 |
| WO | WO0233582 A2 | 4/2002 |
| WO | WO0235873 A2 | 5/2002 |
| WO | WO02061969 A1 | 8/2002 |
| WO | WO02065664 A2 | 8/2002 |
| WO | 02082751 | 10/2002 |
| WO | WO02078211 A2 | 10/2002 |
| WO | 02093843 | 11/2002 |
| WO | WO02100064 A2 | 12/2002 |
| WO | 03032526 | 4/2003 |
| WO | WO03034619 A1 | 4/2003 |
| WO | WO03034642 A2 | 4/2003 |
| WO | WO03039074 A1 | 5/2003 |
| WO | WO03041297 A1 | 5/2003 |
| WO | WO03041343 A2 | 5/2003 |
| WO | 03047176 A1 | 6/2003 |
| WO | WO03050968 A2 | 6/2003 |
| WO | 03069857 A1 | 8/2003 |
| WO | WO03107577 A2 | 12/2003 |
| WO | 2004030287 | 4/2004 |
| WO | 2004038985 | 5/2004 |
| WO | 2005039127 | 4/2005 |
| WO | 2005039133 A | 4/2005 |

OTHER PUBLICATIONS

Mangold, et al.: "IEEE 802.11e Wireless LAN for Quality of Service," Feb. 2002, pp. 1-8, XP002251598.
"ETSI TS 125 214 v6.3.0: ""Universal Mobile Telecommunications System (UMTS): Physical layer procedures (FDD)""", 3G TS 25.214 version 6.3.0 Release 5 (Sep. 2004)".
International Search Report—PCT/US06/035698, International Search Authority—European Patent Office, Feb. 19, 2007.
Written Opinion—PCT/US06/035698, International Search Authority—European Patent Office, Feb. 19, 2007.
International Preliminary Report on Patentability—PCT/US06/035698, The International Bureau of WIPO—Geneva, Switzerland, Mar. 27, 2008.
"TIA/EIA/IS-856 Standard" CDMA2000 High Rate Packet Data Air Interface Specification, Nov. 2000, (the IS-856 standard).
3GPP2 TS 25.211: "Physical channels and mapping of transport channels onto physical channels (FDD)", Release 6, V.6.0.0, Dec. 2003.
3GPP2 TS 25.212: "Multiplexing and channel coding (FDD)", Release 5, V.510.0, Jun. 2005.
3GPP2 TS 25.213: "Spreading and modulation (FDD)", Release 5, V5.6,0, Jun. 2005.
3GPP2 TS 25.214: "Physical layer procedures (FDD)", Release 5, V5.11.0, Jun. 2005.
3GPP: "TIA/EIA/IS-95-B Mobile Station-Base Station Compatibility Standard for Dual-Mode Wideband Spread Spectrum Cellular System".
TR-45.5 "Physical Layer Standard for cdma2000 Spread Spectrum Systems", (the IS-2000 standard).
"A Wireless Token Ring Protocol for Ad-Hoc Networks," IEEE Aerospace Conference Proceedings, 2002, vol. 3, pp. 6-1219 to 3-1228.
3GPP TS 25.211 v5.0.0 (Mar. 2002) Technical Specification Group Radio Access Network; Physical Channels and Mapping of Transport Channels onto Physical Channels (FDD) (Release 5).
3GPP TS 25.212 v6.0.0 (Dec. 2003) Technical Specification Group Radio Access Network; Multiplexing and Channel Coding (FDD) (Release 6).
3GPP TS 25.213 v6.0.0 (Dec. 2003) Technical Specification Group Radio Access Network; Spreading and Modulation (FDD) (Release 6).
3GPP TS 25.214 v6.0.0 (Dec. 2003) Technical Specification Group Radio Access Network; Physical Layer Procedures (FDD) (Release 6).
3GPP2-C.S0002-C v1.0, "Physical Layer Standard for cdma2000 Spread Spectrum Systems", (TR 45.5), Release C, May 28, 2002.
ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Sep. 2004).
ETSI TS 125 211 v5.6.0; "Universal Mobile Telecommunications System (UMTS); Physical channels and mapping of transport channels onto physical channels (FDD)", 3GPP TS 25.211 version 5.6.0 Release 5 (Sep. 2004).
ETSI TS 125 212 v6.2.0; "Universal Mobile Telecommunications System (UMTS); Multiplexing and channel coding (FDD)", 3G TS 25.212 version 6.2.0 Release 5 (Jun. 2004).
ETSI TS 125 213 v6.0.0; "Universal Mobile Telecommunications System (UMTS); Spreading and modulation (FDD)", 3G TS 25.213 version 6.0.0 Release 5 (Dec. 2003).
IEEE Std. 802.11a-1999 Part 11: Wireless LAN Medium Access Control (MAC) and Physical Layer (PHY) Specifications: High-speed Physical Layer in the 5 GHZ Band.
IEEE Std. 802.11b-1999 Part 11: Wireless LAN Medium Access Control (MAC) and Physical Layer (PHY) Specifications: Higher-Speed Physical Layer Extension in the 2.4 GHz Band.
IEEE Std. 802.11e-2003 Part 11: Wireless LAN Medium Access Control (MAC) and Physical Layer (PHY) Specifications, Amendment 4: Further Higher Data Rate Extension in the 2.4 GHz Band.
IEEE Std. 802.11g-2003 Part 11: Wireless LAN Medium Access Control (MAC) and Physical Layer (PHY) Specifications, Amendment 4: Further Higher Data Rate Extension in the 2.4 GHz Band.
Seung et al., : "Multi-Stage Partial PIC Receivers for Multi-Rate DS-CDMA System with Multiple Modulation", IEEE 2003, pp. 591-594.
TIA/EIA-95-B Mobile Station-Base Station Compatibility Standard for Dual-Mode Wideband Spread Spectrum Cellular System (IS-95 Standard), Mar. 1999.
TIA/EIA/IS-856 cdma2000 High Rate Packet Data Air Interface Specification, Nov. 2000.
TIA/EIA/IS-856-A, "cdma2000 High Rate Packet Data Air Interface Specification", (Revision of TIA/EIA/IS-856), Apr. 2004.
TR-45.5 Physical Layer Standard for cdma2000 Spread Spectrum Systems, 3GPP2 C.S000-2D, Version 1.0, Feb. 13, 2004.
Won-Tae et al., : "MMAC : An Efficient WMATM MAC for Multicast Communications", Global Telecommunications Conference—Globecom '99, IEEE , pp. 587-591.
3GPP TS 25.211 Physical channels and mapping of transport channels onto physical channels (FDD). Release 5, V5.0.0, Mar. 2002.
3GPP TS 25.212 v6.0.0 (Dec. 2003) Technical Specification Group Radio Access Network;Multiplexing and Channel Coding (FDD) (Release 6).
ETSI TS 125 213 v6.0.0; "Universal Mobile Telecommunications System (UMTS); Spreading and modulation (FDD)", 3G TS 25.213 version 6,0.0 Release 6 (Dec. 2003).
European Search Report—EP10176962, Search Authority—Munich Patent Office. Nov. 5, 2010.
Miyashita, K. et al. "Eigenbeam Space Division Multiplexing (E-SDM) in a MIMO Channel", Technical Research Report by Electric Information Communication Academic Conference, May 17, 2002, vol. 102, No. 86, pp. 13-18, RCS2002-53.
Taiwanese Search report—095132750—TIPO—Nov. 15, 2010.
TGn Sync Complete Proposal, IEEE 802.11-04/888r13, IEEE mentor, Jul. 8, 2005.
Edfors et al, "OFDM Channel Estimation by Singular Value Decomposition," IEEE Transactions on Communications, 46(7):931-939, (Jul. 1998).
"MIMO-related Technology," Collection of Standard Technologies of the Japan Patent Office, May 25, 2005, 1-1-1, 1-1-3, URL, http://www.jpo.go.jp/shiryou/s_sonota/hyoujun_gijutsu/mimo/mokuji.htm.
Partial European Search Report—EP11175871—Search Authority—Munich—Nov. 28, 2011.

(56) References Cited

OTHER PUBLICATIONS

Cheng Chen J., "A Comparison of MAC Protocols for Wireless Local Networks Based on Battery Power Consumption", INFOCOM '98. Seventeenth Annual Joint Conference of the IEEE Computer and Communications Societies. Proceedings, IEEE, IEEE, Apr. 2, 1998, vol. 1, p. 150-157.

Fang, J.C., et al., "A synchronous, reservation based medium access control protocol for multihop wireless networks", Wireless Communications and Networking, 2003, WCNC 2003. 2003 IEEE, IEEE, Mar. 20, 2003, vol. 2, p. 994-998.

Fu J., et al., "The Largest Eigenvalue Characteristics for MIMO Channel with Spatial Correlation in Multipath Fading", Technical Report of the Institute of Electronics, Information and Communication Engineers, Feb. 27, 2003, vol. 102, No. 681, pp. 171-178, RCS 2002-334.

Gyasi-Agyei A., et al., "GPRS-Features and Packet Random Access Channel Performance Analysis", Networks, 2000. (ICON 2000). Proceedings. IEEE International Conference on, IEEE, Dec. 31, 2000, p. 13-17.

Ivrlac M. T., et al.,"Efficient Use of Fading Correlations in MIMO Systems", Vehicular Technology Conference, 2001, VTC 2001 Fall, vol. 4, pp. 2763-2767.

John Ketchum, et al., "High-Throughput Enhancements for 802.11: Features and Performance of QUALCOMM's Proposal", IEEE802.11-04/0873r1, IEEE mentor, Aug. 13, 2004, slide 58-66.

Kuehnel, Thomas, "Wireless Multimedia Enhancements (WME)", 11-03-0504-01-000e, IEEE mentor, Jul. 23, 2003, paragraph 3.4.3.

Sheu, Shiann-Tsong et al.: "An Improved Data Flushing MAC Protocol for IEEE 802.11 Wireless Ad Hoc Network," VTC 2002-Fall. 2002 IEEE 56th Vehicular Technology Conference Proceedings. Vancouver, Canada, Sep. 24-28, 2002; [IEEE Vehicular Technolgy Conference], New York, NY: IEEE, US, vol. 4, (Sep. 24, 2002), pp. 2435-2439; XP010608871; ISBN: 978-0-78037467-6 the whole document.

Shou-Chih Lo, et al., "An Efficient Multipolling Mechanism forIEEE 802.11 Wireless LANs", Computers, IEEE Transactions on, IEEE, Jun. 30, 2003, vol. 52, Issue 6, p. 764-778.

Taiwan Search Report—TW094118180—TIPO—Mar. 14, 2012.

\* cited by examiner

SCHEDULING WITH REVERSE DIRECTION GRANT IN WIRELESS COMMUNICATION SYSTEMS

CLAIM OF PRIORITY UNDER 35 U.S.C. §119

The present Application for Patent claims priority to Provisional Application No. 60/716,449 entitled "SCHEDULING WITH REVERSE DIRECTION GRANT IN WIRELESS COMMUNICATION SYSTEMS" filed Sep. 12, 2005, and assigned to the assignee hereof and hereby expressly incorporated by reference herein.

BACKGROUND

I. Field

The following description relates generally to wireless communications, and more particularly to utilizing a reverse direction grant in a wireless communication system.

II. Background

Wireless communication systems are widely deployed to provide various types of communication; for instance, voice and/or data may be provided via such wireless communication systems. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Examples of wireless systems that enable various types of communication include Wireless Local Area Networks (WLANs) such as WLANs that comply with one or more of the IEEE 802.11 standards (e.g., 802.11 (a), (b), or (g)). Additionally, IEEE 802.11 (e) has been introduced to improve some of the shortcomings of previous 802.11 standards. For example, 802.11 (e) may provide Quality of Service improvements.

Conventional wireless systems that utilize techniques to provide channel access may allow a particular station (e.g., access point, base station, user terminal, mobile terminal, . . . ) to transmit data during a specified period of time. However, such allocation can result in inefficient use of the channel when the station completes its associated transmission prior to the end of the allocated transmission time period. Thus, there exists a need in the art for a system and/or methodology of improving efficiency in such scheduled wireless systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with reducing waste of communication channel bandwidth in association with scheduled time periods that allocate channel access to particular stations. According to various aspects, systems and methods are described that facilitate providing and/or utilizing reverse direction grants in connection with scheduled channel access. Such systems and/or methods can mitigate an amount of unused channel time after a station completes data transmission prior to an end of the allocated period.

According to related aspects, a method of wireless communication can comprise receiving a multi-poll frame that schedules transmissions for a number of time periods associated with transmission opportunities, communicating data during a particular one of the scheduled time periods associated with a particular transmission opportunity in a first direction according to the multi-poll frame, transmitting a reverse direction grant during the particular scheduled time period associated with the particular transmission opportunity in the first direction, the reverse direction grant enables a recipient to transmit data, and receiving data communicated in a second direction during the particular scheduled time period associated with the particular transmission opportunity. The method can further comprise evaluating whether to transmit the reverse direction grant, determining an amount of time remaining in the particular scheduled time period associated with the particular transmission opportunity, and/or determining whether a station indicated to be a transmitter in the multi-poll frame completed an associated transmission. The method can additionally comprise evaluating whether to employ a received reverse direction grant during at least a portion of a remainder of the particular scheduled time period associated with the particular transmission opportunity, evaluating at least one of an amount of time remaining in the particular scheduled time period and an amount of data to be transmitted in the second direction upon obtaining channel access, and/or generating the multi-poll frame which is a frame that indicates, for each of the number of time periods, information associated with a respective, corresponding transmission opportunity, the information includes at least one of an identity of a transmitting station, an identity of a receiving station, a start time, and a duration.

Another aspect relates to an apparatus that facilitates utilizing a reverse direction grant in a wireless communication system, which can comprise a memory that stores information associated with a schedule related to access of a channel; and a processor, coupled to the memory, that is configured to transmit a reverse direction grant during a transmission opportunity assigned to the apparatus, according to the information, based upon information to be transmitted from the apparatus. The processor can further be configured to utilize a channel access identifier to determine a time at which the apparatus at least one of receives and transmits data, utilize the channel access identifier to synchronize the apparatus to at least one other apparatus, and/or utilize the channel access identifier to operate in a sleep mode during times in which the apparatus is not identified to be at least one of a receiver and a transmitter. The processor can still further be configured to utilize a received reverse direction grant and alter the apparatus from receiving data during a current transmission opportunity to transmitting data during the current transmission opportunity and/or determine whether to employ the reverse direction grant to alter the apparatus from receiving data to transmitting data based at least in part on one or more of an amount of time remaining in the current transmission opportunity and an amount of data to be transmitted by the apparatus. The processor can also be configured to provide the reverse direction grant when the apparatus completes a transmission during the transmission opportunity prior to an end of an allocated duration and/or determine whether to transmit the reverse direction grant based at least in part on an amount of time remaining in the transmission opportunity.

Yet another aspect relates to a wireless communication apparatus, comprising means for receiving data communicated during a particular transmission opportunity in a first direction according to a schedule, means for receiving a reverse direction grant during the particular transmission opportunity in the first direction, and means for transmitting data in a second direction during the particular transmission opportunity via employing the received reverse direction grant. The apparatus can additionally comprise means for identifying a time at which the apparatus is scheduled to at least one of receive and transmit data via a communication channel, means for synchronizing the apparatus to disparate apparatuses, and/or means for enabling the apparatus to utilize a sleep mode to reduce power consumption during transmission opportunities when the apparatus is not communicating via the communication channel. Moreover, the apparatus can comprise means for determining whether to employ a received reverse direction grant during at least a portion of a remainder of the particular transmission opportunity.

Still another aspect relates to a computer-readable medium having stored thereon computer-executable instructions for communicating data during a transmission opportunity in a first direction according to a schedule for channel access, evaluating whether to transmit a reverse direction grant, transmitting a reverse direction grant to a recipient in the first direction during the transmission opportunity, and receiving data from the recipient of the reverse direction grant in a second direction during the transmission opportunity. The computer-readable medium can further comprise instructions for utilizing a sleep mode during a transmission opportunity that allocates channel access to disparate apparatuses and instructions for scheduling a number of transmission opportunities by generating a multi-poll frame which includes a frame that comprises data associated with at least one of a transmitter, a receiver, a start time, and a duration associated with a respective transmission opportunity for each of a plurality of time periods. Additionally, the computer-readable medium can comprise instructions for scheduling a number of transmission opportunities by generating an order in which a token is passed and/or instructions for identifying that an associated station is indicated as a transmitter by the schedule.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
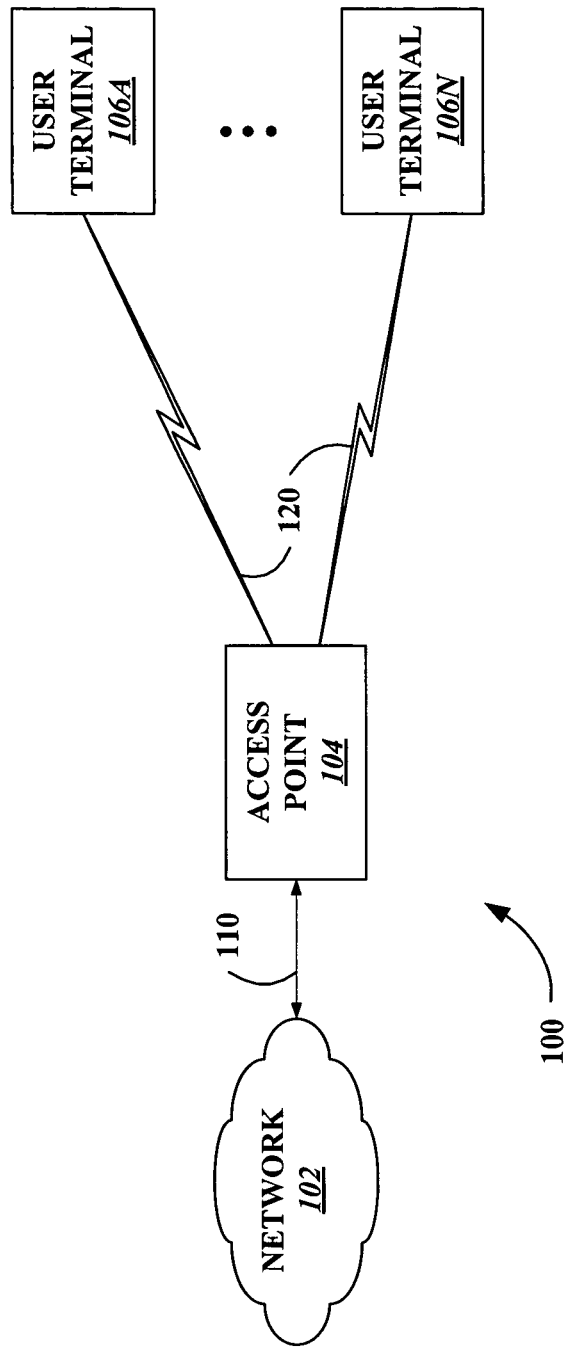
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Additionally, in accordance with 802.11 terminology, access points, user terminals, etc. are referred to as stations or STAs herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., EPROM, card, stick, key drive . . . ). Additionally, various storage media described herein can represent one or more devices and/or other machine-readable media for storing information. The term "machine-readable medium" can include, without being limited to, various other media capable of storing or containing instruction(s) and/or data.

Conventional fully scheduled time division wireless communication systems may be associated with wasteful utilization of a communication channel. For instance, a particular station may be permitted to transmit data during a particular time period over a communication channel. However, when the station completes a transmission prior to the end of the allocated period, resources associated with the channel are wasted since disparate stations are typically not enabled to access the channel to transmit data during this period. Thus, it becomes desirable to facilitate providing reverse direction grants (RDGs) in association with scheduled channel access periods to mitigate communication channel waste. The reverse direction grant may be utilized by the obtaining station to access the channel during the remainder of the allocated period.

Referring now to FIG. 1, a wireless communication system 100 is illustrated in accordance with various aspects set forth herein. System 100 includes an Access Point (AP) 104 that is communicatively coupled to one or more User Terminals (UTs) 106A-N, where N may be any positive integer. In accordance with 802.11 terminology, AP 104 and UTs 106A-N are also referred to as stations or STAs herein. AP 104 and UTs 106A-N communicate via Wireless Local Area Network (WLAN) 120. According to one or more aspects, WLAN 120 is a high speed MIMO OFDM system; however, WLAN 120 may be any wireless LAN. Access point 104 communicates with any number of external devices or processes via network 102. Network 102 may be the Internet, an intranet, or any other wired, wireless, or optical network. Connection 110 carries signals from the network 102 to the access point 104. Devices or processes may be connected to network 102 or as UTs 106A-N (or via connections therewith) on WLAN 120. Examples of devices that may be connected to either network 102 or WLAN 120 include phones, Personal Digital Assistants (PDAs), computers of various types (laptops, personal computers, workstations, terminals of any type), media devices such as HDTV, DVD player, wireless speakers, cameras, camcorders, webcams, and virtually any other type of data device. Processes may include voice, video, data communications, etc. Various data streams may have varying transmission requirements, which may be accommodated by using varying Quality of Service (QoS) techniques.

System 100 may be deployed with a centralized AP 104. All UTs 106A-N may communicate with AP 104 according to an example. Additionally or alternatively, two or more of the UTs 106A-N may communicate via direct peer-to-peer communication (e.g., employing Direct Link Set-Up (DLS) associated with 802.11(e)). Access may be managed by AP 104 and/or may be ad hoc (e.g., contention based).

In accordance with various aspects, a reverse direction grant can be employed in connection with a wireless communication system, such as system 100. The reverse direction grant can be utilized with a schedule that allocates channel access for a number of time periods, each of the time periods being associated with a particular station (e.g., AP 104, one of UTs 106A-N, etc.) that transmits data via a communication channel (e.g., WLAN 120) to a particular second station (e.g., AP 104, one of UTs 106A-N, etc.). A multi-poll frame may be utilized to define a schedule of transmissions for a corresponding multi-poll period. Scheduled transmissions during a multi-poll period may include transmissions from AP (e.g., AP 104) to STAs (e.g., UTs 106A-N), from STAs to AP, as well as from STAs to other STAs. For example, the multi-poll frame may be a SCHED frame that defines multiple downlink, multiple uplink, and/or multiple direct link STA-STA transmissions may be provided to the stations (e.g., AP 104, one of UTs 106A-N, etc.). The SCHED frame thus may be a single frame that schedules a number of communication periods, wherein the SCHED frame may indicate that a first station is a transmitter, a second station is a receiver, a start time, and a duration for the access to the channel for each of the scheduled periods. It is contemplated that the aspects of the present disclosure is not limited to use of a SCHED frame; for example, the scheduling can be effectuated utilizing a multi-poll, a consolidated poll, and/or a token that is passed between stations in an agreed upon order. Accordingly, it is to be appreciated that any scheduling associated with channel access falls within the scope of the aspects of the present disclosure.

The station identified as the transmitter may finish transmitting data over the channel (e.g., WLAN 120) prior to the end of the allocated channel access duration. Accordingly, the transmitter can provide a reverse direction grant to the receiver, thereby enabling the receiver to transmit data over the channel (e.g., WLAN 120). The receiver that obtains the reverse direction grant can thereafter transmit data to the transmitter during the remaining portion of the duration, for instance. According to another illustration, the transmitter can provide a reverse direction grant to AP 104, such as, for example, during a scheduled period for direct link STA-STA communication (e.g., UT 106A scheduled to transmit and UT 106N scheduled to receive). Thus, AP 104 can communicate with the transmitter (e.g., UT 106A) via the channel (e.g., WLAN 120) during the remainder of the allocated time period.

UTs 106A-N and AP 104 may employ synchronized clocks to enable transmitting and/or receiving data at respective scheduled times in accordance with a received and/or generated multi-poll frame (and/or SCHED frame, consolidated poll, token passed according to a schedule, . . . ). The multi-poll frame enables stations to access the channel during allocated times, and provides an amount of time during which the transmitting station can transmit data via the channel. The schedule provides notification to each transmitter STA related to times a transmission opportunity (TXOP) starts and ends. Thus, the transmitting station can transmit any amount of data that fits into the allocated time slot. Additionally, the schedule may also inform the receiver STA when to be awake to receive traffic.

802.11e provides the concept of a TXOP. Instead of accessing the channel to send a single frame of data, a STA is provided a period of time during which it is allowed to use the channel to transmit as many frames as fit within that period. TXOP reduces overhead associated with channel access; for instance, idle time and collisions are reduced in connection with Enhanced Distributed Channel Access (EDCA) and polling overhead is mitigated in relation to HCF Controlled Channel Access (HCCA).

By way of a further example, the multi-poll frame can indicate that UT 106A is a transmitter at a time associated with a first time period (e.g., first poll) and AP 104 is a receiver at that time. UT 106A is provided with a TXOP at the allocated time. During the TXOP, UT 106A may transmit any amount of data to AP 104. For instance, UT 106A may transmit any number of MAC Protocol Data Units (MPDUs) separated by Short Interframe Spacing (SIFS) to AP 104. Additionally or alternatively, UT 106A may aggregate the MDPUs and remove the SIFS that separate MPDUs, and thus transmit an Aggregated MPDU (A-MPDU). Further, a block ACK request can be transmitted by UT 106A and/or can be aggregated as part of the A-MPDU. If the multi-poll frame allocates an amount of time for UT 106A to transmit data over the communication channel such that additional time remains in the TXOP subsequent to UT 106A completing the transmission, UT 106A may transmit a reverse direction grant to AP 104. AP 104 may employ the reverse direction grant to transmit data over the communication channel, for instance, to UT 106A for the remaining time within the TXOP. Upon receipt of the reverse direction grant, AP 104 may evaluate the remaining time in the allocated period and/or data stored in buffer(s) associated with AP 104 that is to be transmitted. Based at least in part on this evaluation, AP 104 may utilize and/or not employ the reverse direction grant to transmit data via the channel. It is to be appreciated that this example is merely for illustration purposes, and the aspects of the present disclosure is not so limited.

Example embodiments are disclosed herein that support efficient operation in conjunction with very high rate physical layers for a wireless LAN (or similar applications that use newly emerging transmission technologies). Various example embodiments preserve the simplicity and robustness of legacy WLAN systems, examples of which are found in 802.11(a-e). The advantages of the various embodiments may be achieved while maintaining backward compatibility with such legacy systems. (Note that, in the description below, 802.11 systems are described as example legacy systems. It should be noted, that one or more of the improvements discussed herein are also compatible with alternate systems and standards.)

Figure 2:
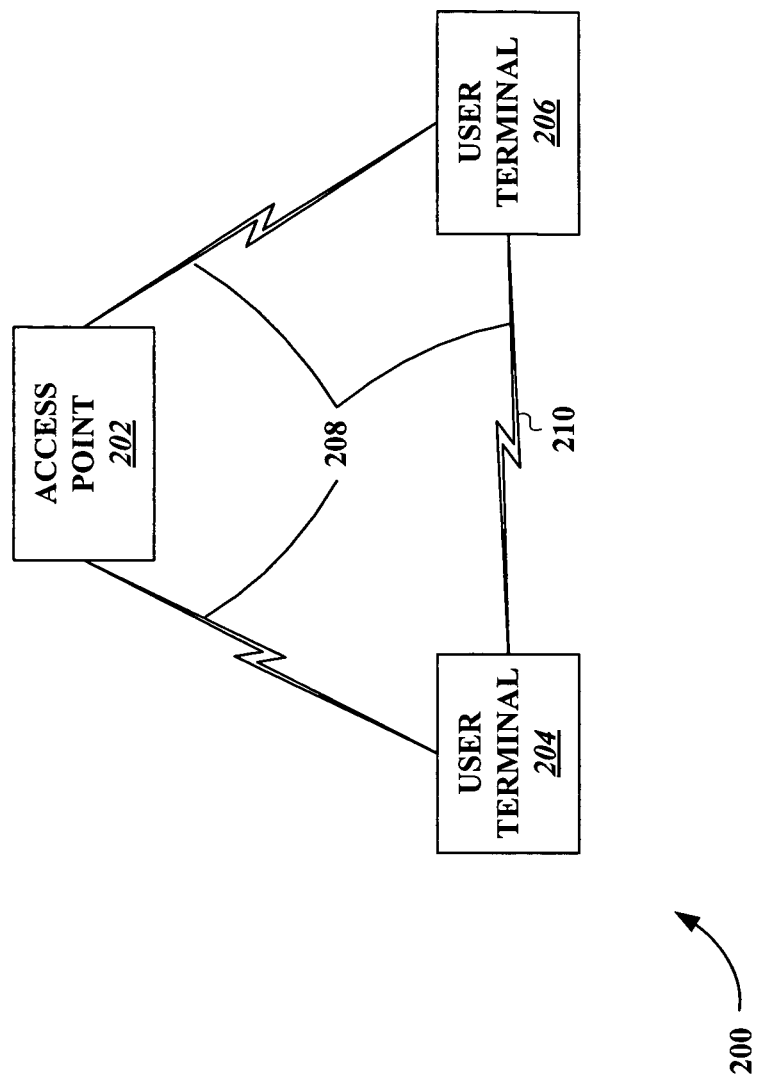
FIG. 2 is an illustration of a system that employs reverse direction grants in connection with scheduled times to access a communication channel in accordance with various aspects.

Turning to FIG. 2, illustrated is a system 200 that employs reverse direction grants in connection with scheduled times to access a communication channel in accordance with various aspects. The system 200 includes an Access Point (AP) 204, a first User Terminal (UT) 204, and a second User Terminal (UT) 206. It is to be appreciated that the system 200 may include any number of additional APs and/or UTs. AP 204 and UTs 204-206 communicate via Wireless Local Area Network (WLAN) 208. AP 204 may provide a schedule to UTs 204-206 associated with access to WLAN 208. For instance, a multi-poll frame (e.g., SCHED frame) may be transmitted, an order may be predetermined for a token to pass between stations, etc.

According to an example, the schedule may indicate that during a particular time segment, UT 204 is a transmitter and UT 206 is a receiver. Thus, UT 204 and UT 206 communicate via connection 210 which is associated with WLAN 208. If UT 204 completes transmission of data prior to the end of the allocated time segment as provided by the schedule, UT 204 may transmit a reverse direction grant to UT 206 via connection 210. UT 206 may utilize the reverse direction grant to transmit data via WLAN 208. For instance, UT 206 may transmit data to UT 204 and/or AP 202 during the remaining portion of the allocated time segment. By way of illustration, disparate UTs other than UT 204 and UT 206 (not shown) may be sleeping during this particular time segment.

Figure 3:
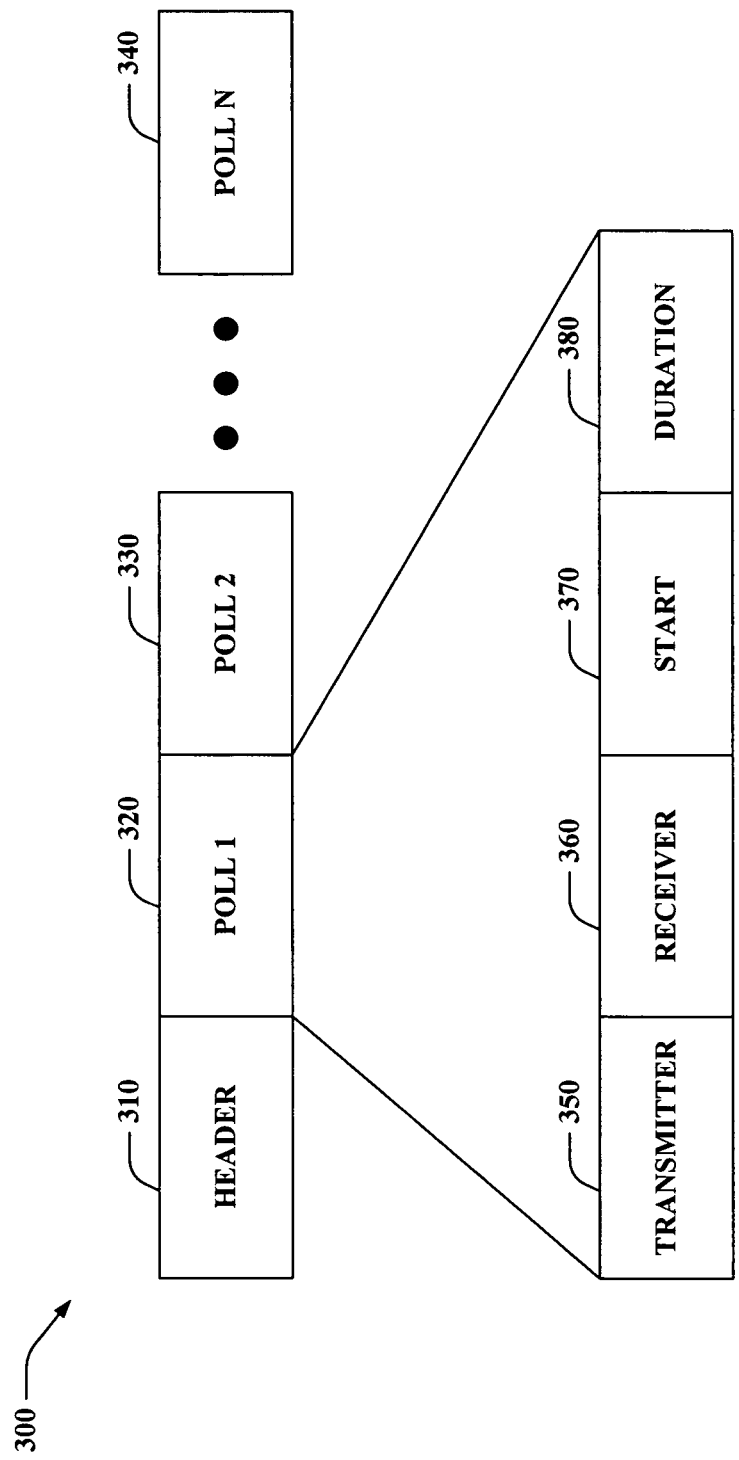
FIG. 3 is an illustration of a multi-poll that may be utilized to schedule channel access.

With reference to FIG. 3, illustrated is a multi-poll frame 300 (e.g., consolidated poll) that may be utilized to schedule channel access. Multi-poll frame 300 may be provided according to 802.11n. Multi-poll frame 300 includes a header 310 that may comprise synchronization data. Multi-poll frame 300 may also include a sequence of any number of polls (e.g., poll 1 320, poll 2 330, poll N 340, where N is any positive integer). Each of the polls (e.g., poll 1) may include data identifying a station as a transmitter 350, data identifying a disparate station as a receiver 360, data indicating a start time 370, and data indicating a duration 380.

According to various aspects, multi-poll frame 300 is transmitted to the stations and the stations are awake to receive multi-poll frame 300. Each station may identify and store a time when the station is a receiver or a transmitter by reviewing the received multi-poll frame 300. During the times when the station is not a receiver or a transmitter, the station may be in sleep mode. Thus, power consumption associated with the stations is reduced. Additionally, polling overhead is mitigated via utilizing header 310 with a sequence of polls (e.g., polls 320-340) rather than a separate header with a single poll.

Figure 4:
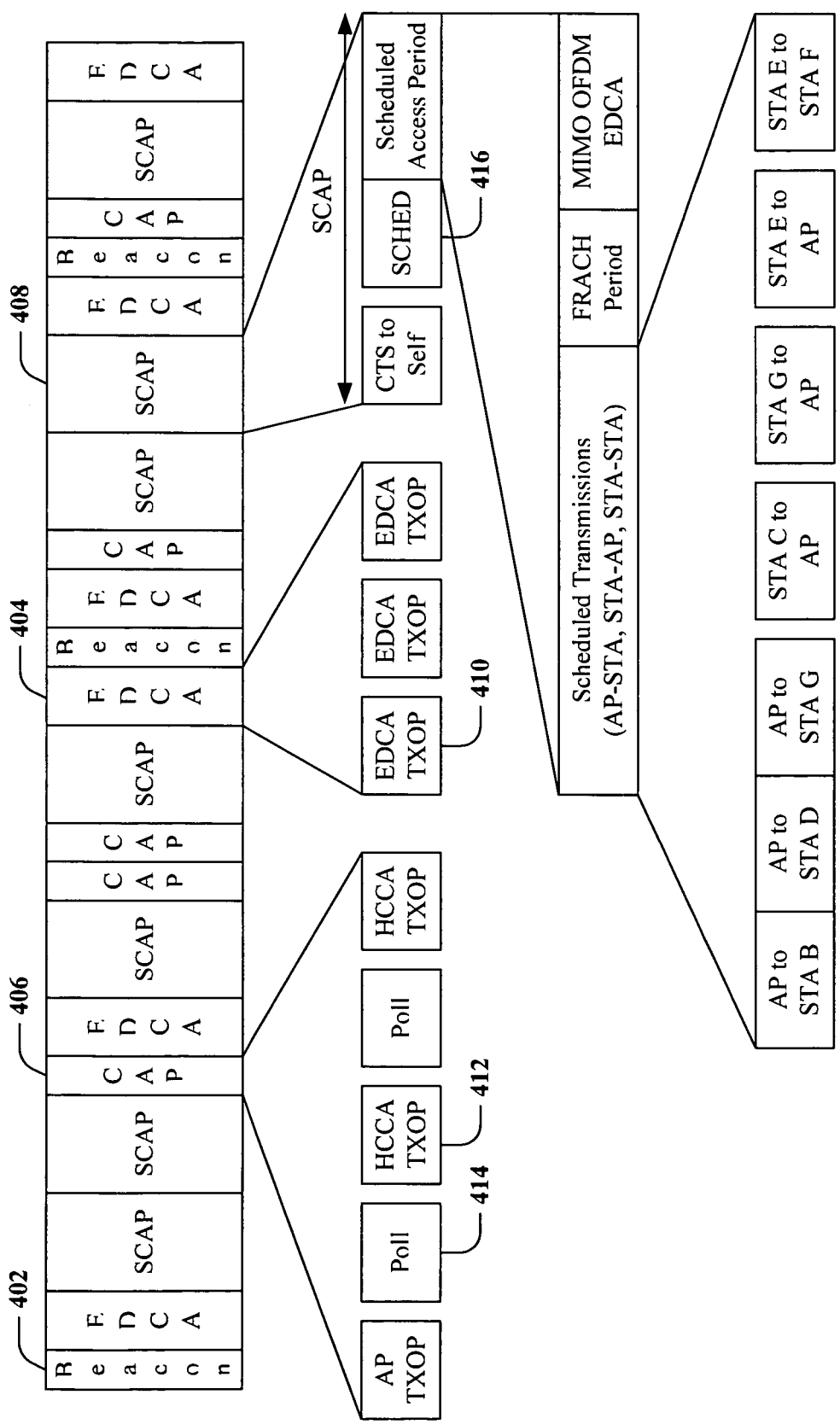
FIG. 4 is an illustration of an example that demonstrates utilization of Scheduled Access Periods (SCAPs) with disparate techniques for channel access.

Turning to FIG. 4, illustrated is an example that demonstrates utilization of Scheduled Access Periods (SCAPs) with disparate techniques for channel access. Within a beacon interval (e.g., between two Beacons 402), several channel access methods can be interspersed. For instance EDCA, HCCA and/or SCHED can be present. 802.11e introduced the Transmission Opportunity (TXOP). To improve efficiency, when a STA acquires the medium through Enhanced Distributed Channel Access (EDCA) or through a polled access in HCF Controlled Channel Access (HCCA), the STA may be permitted to transmit more than a single frame, which is referred to as the TXOP.

During Beacon intervals (e.g., Beacon 402), an AP has flexibility to adaptively intersperse durations of EDCA contention-based access (e.g., EDCA 404), 802.11e controlled access phase (CAP) (e.g., CAP 406), and Scheduled Access Period (SCAP) (e.g., SCAP 408). EDCA 404 may include one or more EDCA TXOPs 410. During EDCA TXOP 410, an acquiring STA may be permitted to transmit one or more frames. The maximum length of each EDCA TXOP 410 depends on the Traffic Class and may be established by the AP. A STA may gain access to a channel after sensing the channel to be idle for at least an amount of time corresponding to an associated Interframe Spacing.

CAP 406, which may be associated with HCCA, is a bounded time interval and may be formed by concatenating a series of HCCA TXOPs 412. An AP may establish a Contention-Free Period (CFP) during which the AP can provide polled access to associated STAs. The contention-free poll (CF-Poll), or poll 414, is transmitted by the AP and is followed by a transmission from the polled STA. The Direct Link Set-Up (DLS) associated with 802.11e allows a STA to forward frames directly to another destination STA with a Basic Service Set (BSS). The AP may make a polled TXOP available for this direct transfer of frames between STAs. Additionally, during polled access, the destination of frames from the polled STA may be the AP.

An Adaptive Coordination Function (ACF) may be utilized as an extension of the HCCA and EDCA that permits flexible, highly efficient, low latency scheduled operation suitable for operation with high data rates enabled by the MIMO Physical layer (PHY). Using a SCHED message 416 as part of the SCAP 408, the AP may simultaneously schedule one or more AP-STA, STA-AP and STA-STA TXOPs over a period known as a Scheduled Access Period (SCAP). The maximum permitted value of the SCAP may vary, and according to an aspect may be 4 ms. Pursuant to another example, the maximum value of the SCAP may be 2.048 ms; however, the aspects of the present disclosure are not so limited.

MIMO STAs obey the SCAP boundary. The last STA to transmit in a SCAP 408 terminates its transmission no later than the end of its allocated TXOP. MIMO STAs obey the scheduled TXOP boundaries and complete their transmission prior to the end of the assigned TXOP. This reduces the chance of collisions and allows the subsequent scheduled STA to start its TXOP without sensing the channel to be idle.

The AP may use the following procedures for recovery from SCHED receive errors. If a STA is unable to decode a SCHED message it will not be able to utilize its TXOP. If a scheduled TXOP does not begin at the assigned start time, the AP may initiate recovery by transmitting at a PIFS after the start of the unused scheduled TXOP. The AP may use the period of the unused scheduled TXOP as a CAP. During the CAP, the AP may transmit to one or more STA (e.g., STA(s) that are awake) or poll the STA that missed the scheduled TXOP or another STA. The CAP is terminated prior to the next scheduled TXOP. The same procedures may also be used when a scheduled TXOP terminates early. The AP may initiate recovery by transmitting at a PIFS after the end of the last transmission in the scheduled TXOP. The AP may use the unused period of a scheduled TXOP as a CAP.

Figure 5:
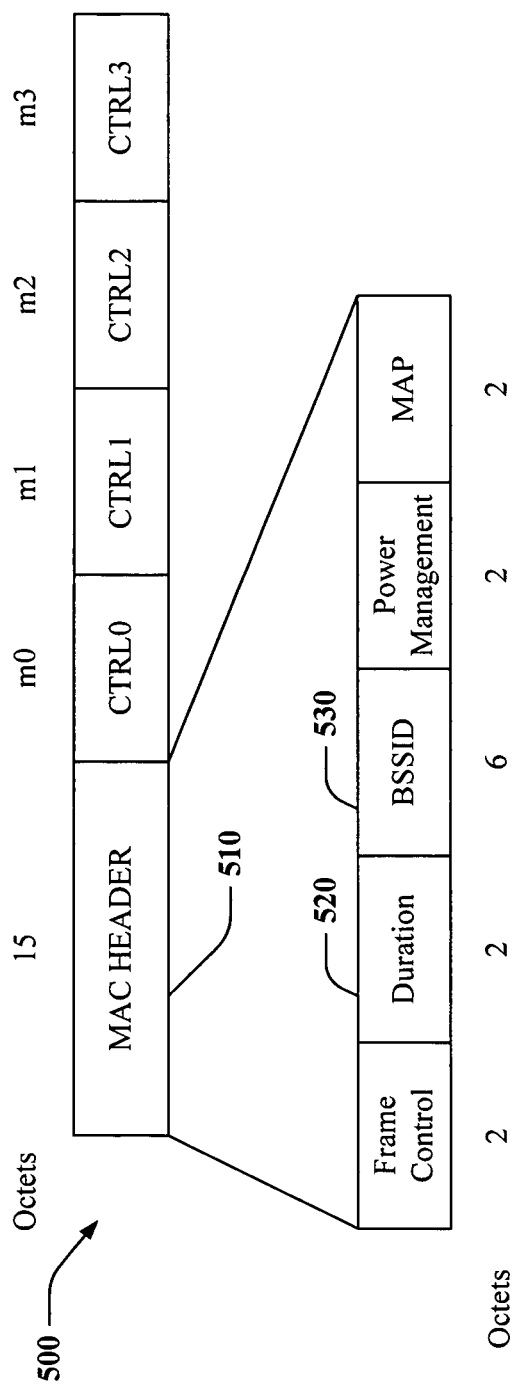
FIG. 5 is an illustration of an example of a SCHED frame in accordance with various aspects.

Turning to FIG. 5, illustrated is an example of a SCHED frame 500 in accordance with various aspects. SCHED message 500 may be transmitted as a special SCHED Physical (PHY) Protocol Data Unit (PPDU); however, the aspects of the present disclosure are not so limited. A MAC Header 510 field of SCHED frame 500 may be 15 octets in length; however, the aspects of the present disclosure are not so limited. The presence and length of the CTRL0, CTRL1, CTRL2 and CTRL3 segments are indicated in the SIGNAL field of the SCHED PPDU. The transmission rate of CTRL0 may, or may not, be lower than the transmission rate of CTRL1 and so on. Hence, CTRL0 may signal STA(s) that have a poor radio link with the AP, and may allow maximal transmission range. Additionally, CTRL3 may be transmitted at a high rate and minimizes the transmission time for signaling STA(s) with a good radio link to the AP. Bits 13-0 of the Duration field 520 may specify the length of the SCAP, e.g. in microseconds. The Duration field 520 is used by STAs capable of MIMO OFDM transmissions to set a network allocation vector (NAV) for the duration of the SCAP. NAV may be utilized to determine a length of time the channel will be busy in the future. NAV may be set by a request-to-send (RTS) and/or a clear-to-send (CTS) frame. A Basic Service Set Identifier (BSSID) 530 may be a media access control (MAC) address of a station or an AP.

Figure 6:
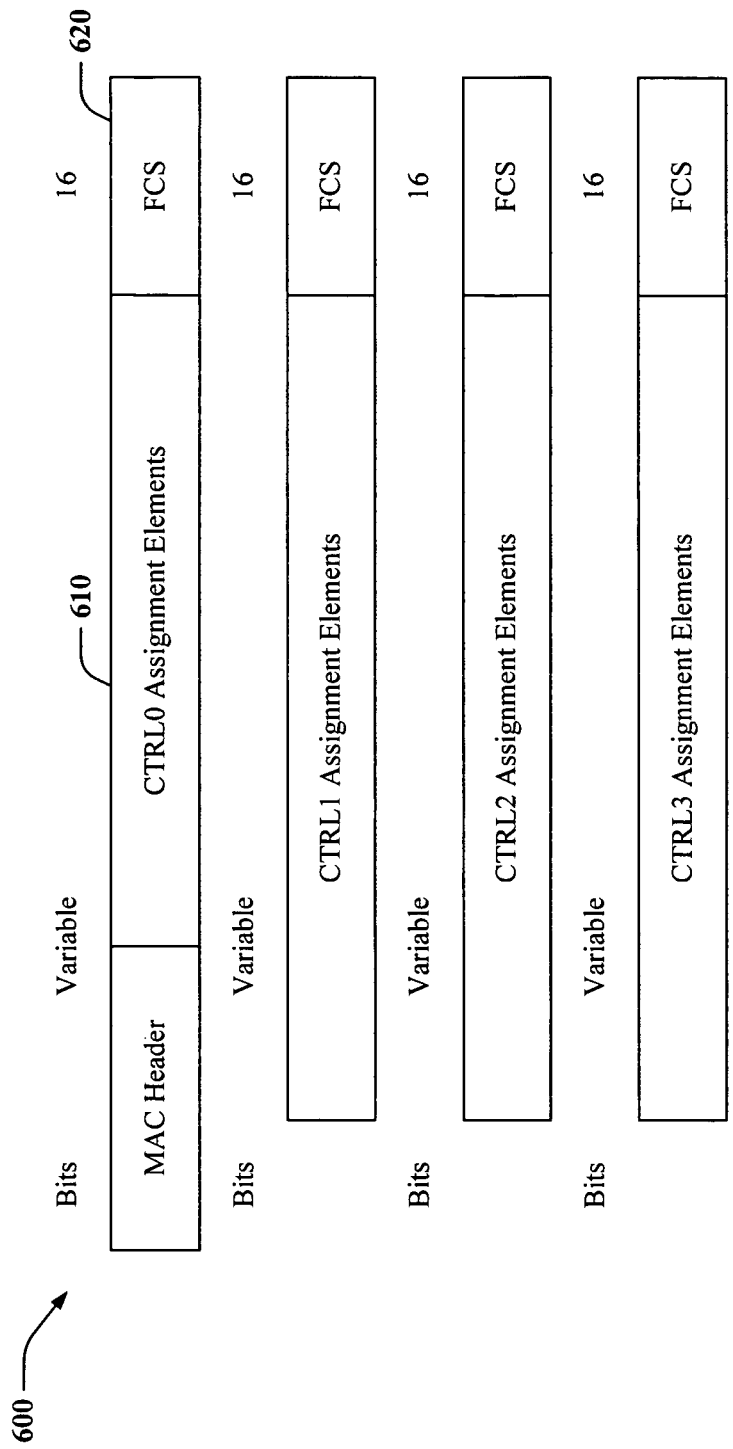
FIG. 6 is an illustration of an example of a SCHED message in accordance with various aspects.

With reference to FIG. 6, illustrated is another example of a SCHED message 600 in accordance with various aspects. The SCHED message 600 defines the schedule for the SCAP. Each of the CTRL0, CTRL1, CTRL2 and CTRL3 segments are of variable length and may be transmitted at 6, 12, 18 and 24 Mbps, respectively. A number of assignment elements 610 may be included in each CTRLJ segment. Each assignment element 610 specifies the transmitting STA association identity (AID), the receiving STA AID, the start time of the scheduled TXOP and the maximum permitted length of the scheduled TXOP. Inclusion of the transmitting and receiving STA in the assignment elements permits efficient power-save at STAs that are not scheduled to transmit or receive during the SCAP. When legacy STAs are present in the BSS, the AP may utilize additional means to protect the SCAP, e.g., a legacy CTS-to-Self. SCHED message 600 additionally includes frame check sequences (FCSs) 620.

Figure 7:
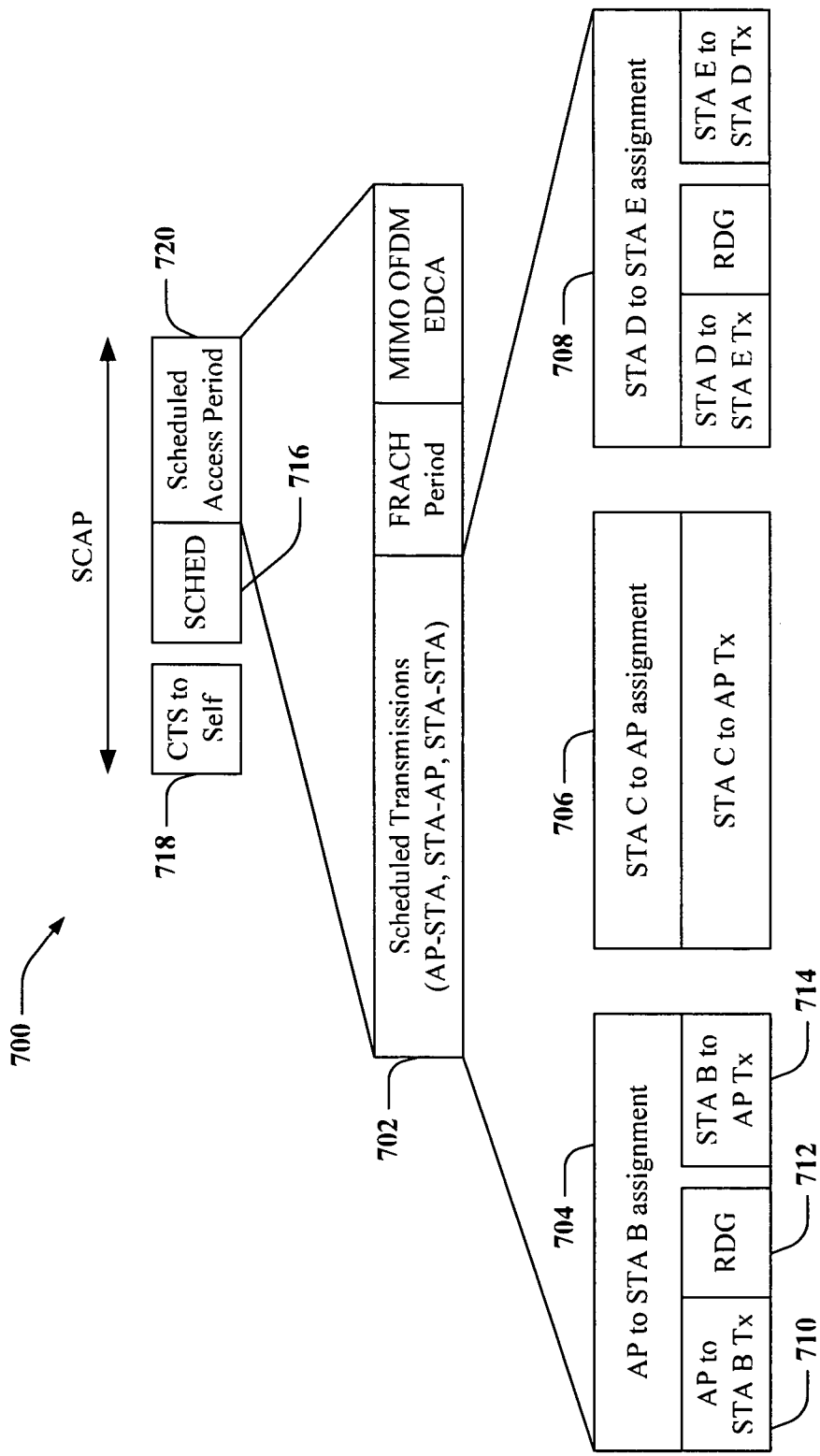
FIG. 7 is an illustration of an example of a SCAP where scheduling is utilized with reverse direction grants in accordance with various aspects.

With reference to FIG. 7, illustrated is an example of a SCAP 700 where scheduling is utilized with reverse direction grants in accordance with various aspects. The reverse direction grants may be available to both an access point and a station. Additionally, a reverse direction grant may be employed when a Direct Link (DL) is established between two stations. A number of transmissions may be scheduled 702. For example, transmissions may be scheduled from an AP to a STA (e.g., AT to STA B assignment 704), from a STA to an AP (e.g., STA C to AP assignment 706), from a STA to a STA (e.g., STA D to STA E assignment 708), etc. Assuming a transmitter (e.g., AP, STA) completes transmission of data during a TXOP with time remaining in the TXOP (e.g., AP to STA B Tx 710), the transmitter may use a reverse direction grant (e.g., RDG 712) to a provide access to the channel to a disparate STA active during that interval. Thus, the transmitting STA may transmit an RGD in a first direction to a receiving STA.

In response to the RDG, the responder may have an opportunity to transmit traffic (e.g., STA B to AP Tx 714) in a second direction without having to perform random channel access. Thus, the probability of collision with another STA accessing the channel at the same time is mitigated provided all the other STA decoded the SCHED frame and set their NAV appropriately. Also, the responder is permitted to transmit traffic related to the data just received, hence reducing the round-trip delay. Examples of traffic that can benefit from lower round trip time are TCP ACKS, VoIP traffic, Block Acks, etc.

A number of variations of reverse direction grants are contemplated. For instance, the transmitter may provide a reverse direction grant to a receiver. According to another example, the transmitter may provide a reverse direction grant to a receiver and/or an AP (assuming that the receiver was a STA other than the AP). Pursuant to a further illustration, the transmitter may transmit a reverse direction grant to any third party STA.

The signaling utilized to perform the defined RDG with EDCA may be simplified for ease of implementation. For example in the case of EDCA the following could be used: (i) one bit may be used to let the responder know that an RDG is granted; (ii) three bits may be used to let the responder know which class of QoS traffic is permitted in the RDG; and (iii) one bit may be used to terminate the responder's response and give the TXOP back to the initiator. In a TXOP, it is not required to transmit a particular class of QoS traffic, hence the data associated with QoS may not be utilized. Further, additional information may be used. Also, the number of bits for each message type may vary and is application dependent.

SCHED frame 716 defines how the STAs are allowed to access the channel for a future period of time. SCHED frame 716 signals when a transmitter STA is to start and/or stop transmitting. Additionally, SCHED frame 716 indicates when a receiver STA is to awaken to start receiving data and when that period ends, which may be adjacent to a transmission period for the STA. A STA whose address does not appear as a transmitter or receiver in the SCHED frame 716 may go into sleep mode to maximize power savings. A clear-to-send (CTS) to self 718 may be employed to set a NAV associated with the SCHED frame 716. The CTS (and/or RTS) 718 can be sent using one of the rates decodable by all legacy STA and may be used to improve protection for data frame transmission. The CTS to self 718 may include duration information associated with SCHED 716 and/or a scheduled access period 720.

One potential drawback of a conventional scheduling mode of operation is the risk to waste the channel if the assigned transmission duration is excessive. Indeed once sent, the schedule is fixed and cannot be modified until another SCHED frame is sent. Without the use of a reverse direction grant, if a transmitter runs out of traffic to send to the assigned receiver during the assigned time, no other STA can use the channel and the resource is wasted.

Reverse direction grants may allow a transmitter to provide remaining scheduled time to the receiver. When a reverse direction grant is employed with HCCA, a number of polls transmitted by an AP may be reduced in half. For example, instead of scheduling a time for STA1 to transmit with STA2 to receive and another time with STA2 to transmit and STA1 to receives, the scheduler can group them together. The multiplexing of these two flows may allow for simpler and more efficient scheduling algorithms. It is to be appreciated that the aspects of the present disclosure is not limited to these examples.

Figure 8:
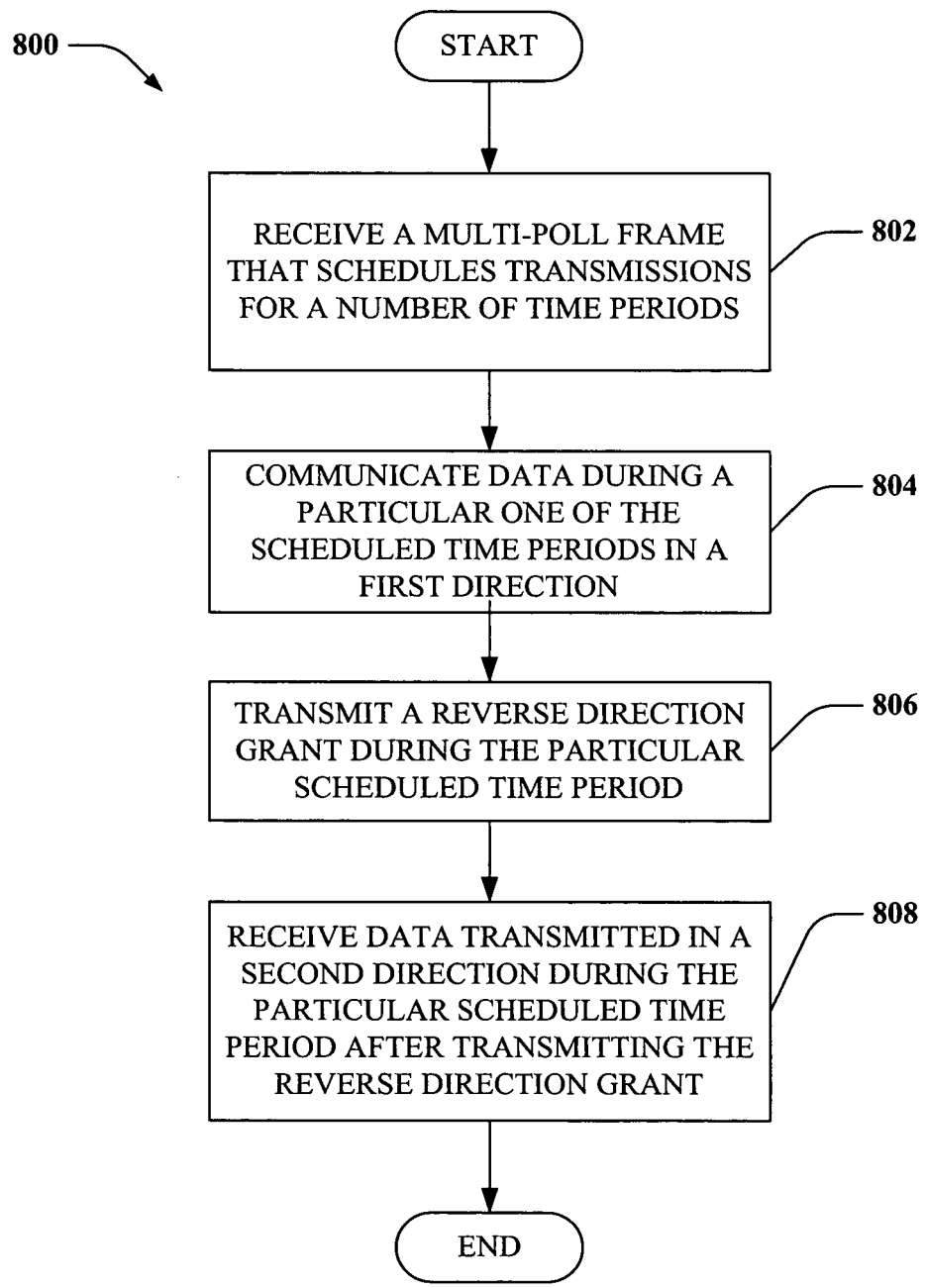
FIG. 8 illustrates a methodology for utilizing reverse direction grants within an allocated time period for accessing a channel to facilitate reducing an amount of wasted channel bandwidth in a wireless communication system, in accordance with one or more aspects.
Figure 9:
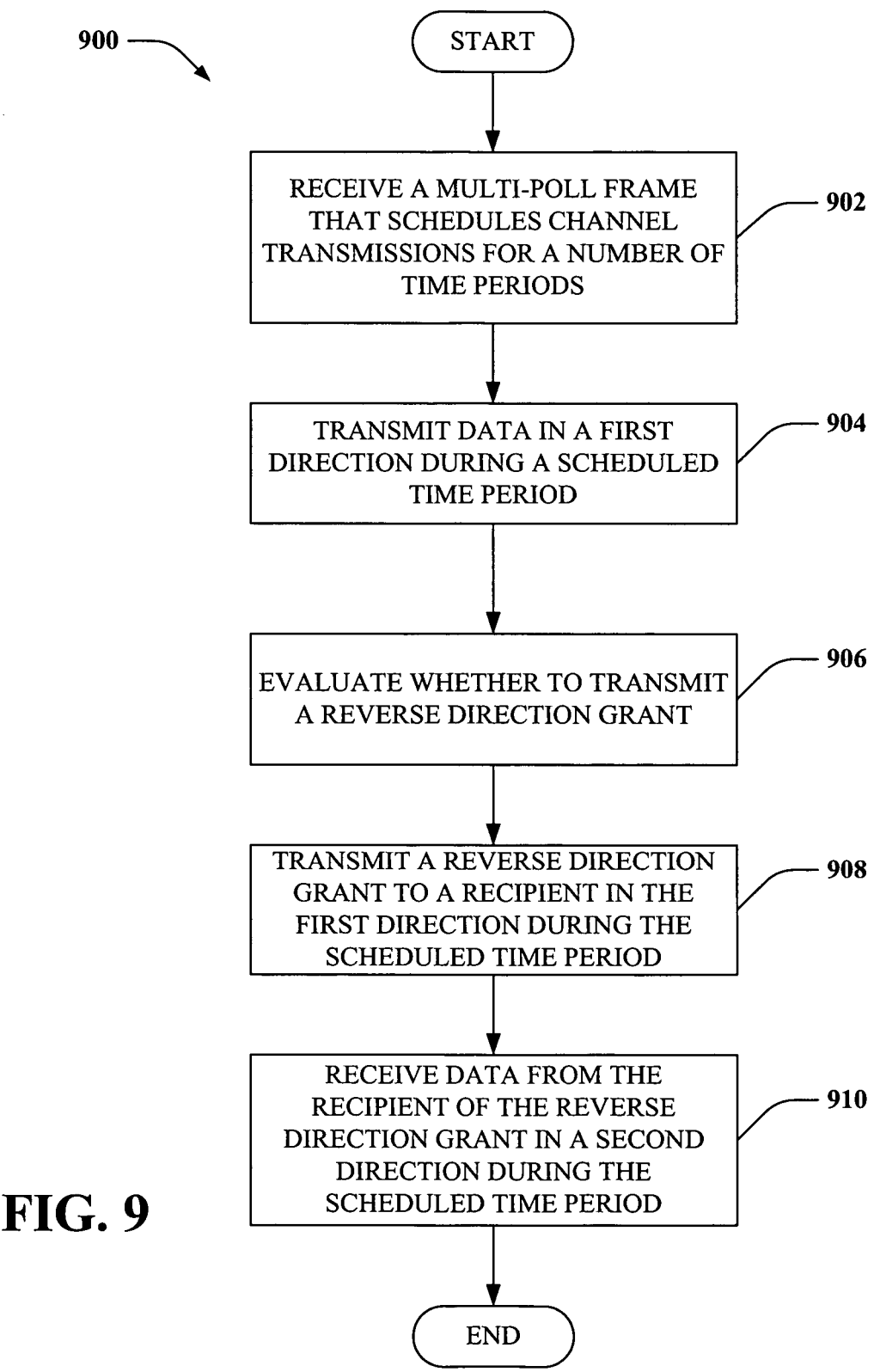
FIG. 9 is an illustration of a methodology for providing a reverse direction grant in connection with scheduled access to a communication channel in accordance with a plurality of aspects described herein.
Figure 10:
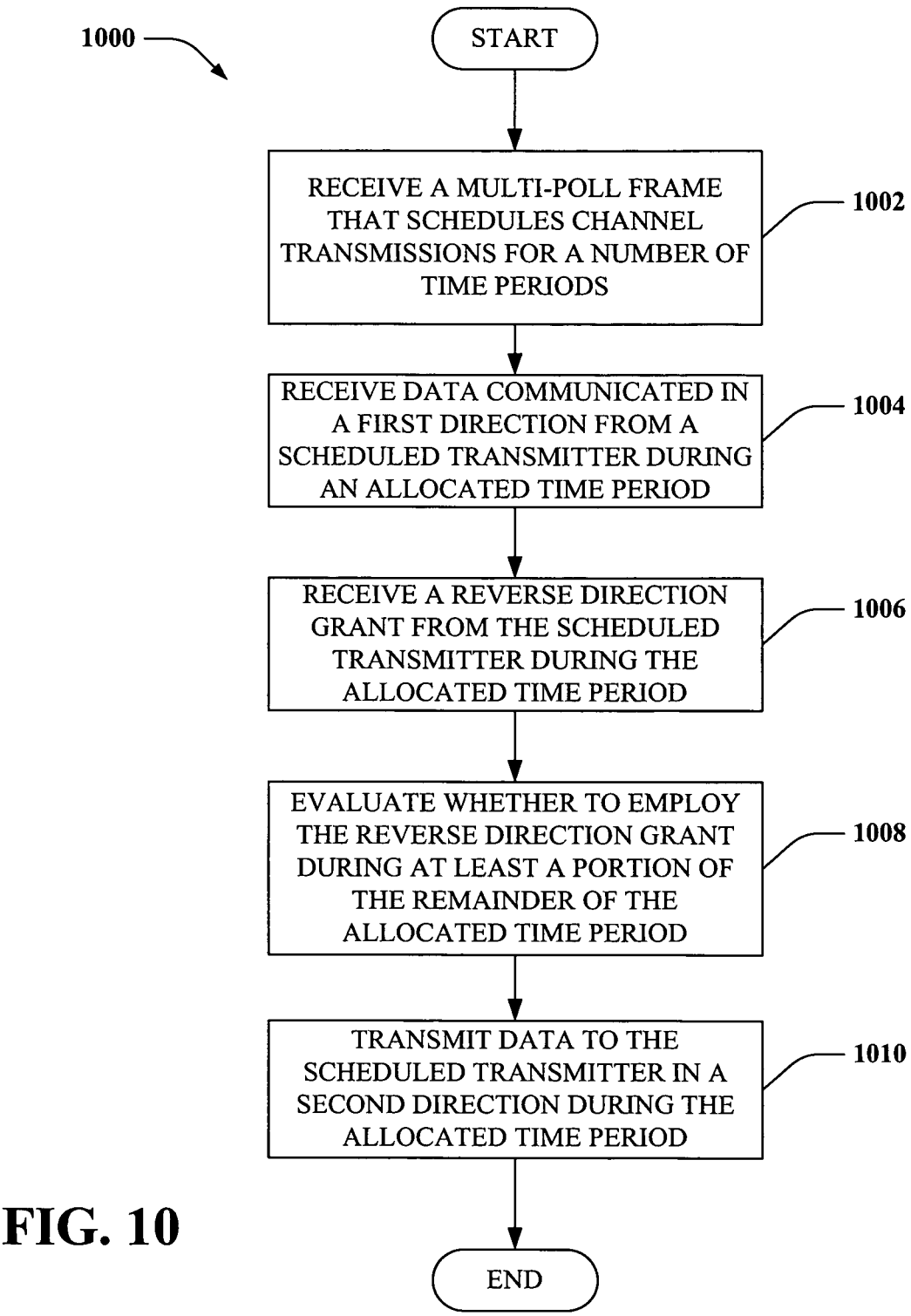
FIG. 10 is an illustration of a methodology for employing a reverse direction grant in association with scheduled channel access periods in accordance with various aspects.

Referring to FIGS. 8-10, methodologies relating to utilizing a reverse direction grant in connection with scheduled transmission periods are illustrated. For example, methodologies can relate to employing reverse direction grants in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, a methodology could alternatively be represented as a series of interrelated states or events, such as in a state diagram. Moreover, not all illustrated acts may be required to implement a methodology in accordance with one or more embodiments.

FIG. 8 illustrates a methodology 800 for utilizing reverse direction grants within an allocated time period for accessing a channel to facilitate reducing an amount of wasted channel bandwidth in a wireless communication system, in accordance with one or more aspects. At 802, a multi-poll frame (e.g., SCHED frame) that is utilized to schedule channel access during a number of time periods is received. For instance, the multi-poll frame may indicate a transmitting station, a receiving station, a start time, and/or a duration of channel access for each of the time periods. Pursuant to an example, the multi-poll frame may be generated by an access point and transmitted to disparate stations; however, the aspects of the present disclosure are not so limited. Additionally or alternatively, consolidated poll, SCHED frame, token, etc. may be employed in connection with scheduling transmissions associated with a number of time periods. At 804, communication of data occurs in a first direction during a particular one of the scheduled time periods. The multi-poll frame may be employed to identify a transmitter and/or receiver at a particular time. Thus, the transmitter may access the channel to transmit data to the receiver (in the first direction) in accordance with the multi-poll frame. At 806, a reverse direction grant is transmitted during the particular scheduled time period. If the transmitter completes its transmission prior to the end of the scheduled time period, a reverse direction grant may be transmitted to the receiver. At 808, data that is transmitted in a second direction (e.g., from the station indicated as the receiver by the multi-poll frame to the station indicated as the transmitter, from the station indicated as the receiver by the multi-poll frame to an access point, . . . ) is received during the particular scheduled time period after transmitting the reverse direction grant.

Turning to FIG. 9, illustrated is a methodology 900 for providing a reverse direction grant in connection with scheduled access to a communication channel in accordance with a plurality of aspects described herein. At 902, a multi-poll frame that schedules channel transmissions for a number of time periods is received. The multi-poll frame may provide indications related to which stations are to communicate via a communication channel and/or when the communication is to occur. It is to be appreciated that the aspects of the present disclosure is not limited to use of a multi-poll frame. An access point may obtain a multi-poll frame via producing a schedule associated with a particular scheduled access period and generating the multi-poll frame. Further, the access point may transmit the multi-poll frame to user terminal(s), thereby enabling the user terminal(s) to obtain the multi-poll frame. At 904, data is transmitted in a first direction during a scheduled time period. The transmission of data may be in accordance with the multi-poll frame. At 906, an evaluation is performed to determine whether to transmit a reverse direction grant. For example, an evaluation is made as to an amount of time remaining in the scheduled time period and/or whether the transmitting station as indicated in the multi-poll frame completed its transmission. If it is determined that the reverse direction grant should be provided, at 908, a reverse direction grant is transmitted to a recipient in the first direction during the scheduled time period. At 910, data is received from the recipient of the reverse direction grant which is transmitted in a second direction during the scheduled time period. Pursuant to an example, the second direction may be from the original receiver to the original transmitter; however, the aspects of the present disclosure are not so limited.

With reference to FIG. 10, illustrated is a methodology 1000 for employing a reverse direction grant in association with scheduled channel access periods in accordance with various aspects. At 1002, a multi-poll frame that schedules channel transmissions and/or access for a number of time periods is received. At 1004, data that is communicated in a first direction from a scheduled transmitter (e.g., as indicated via the multi-poll frame) is received during an allocated time period. At 1006, a reverse direction grant is received from the scheduled transmitter during the allocated time period. At 1008, an evaluation is performed to determine whether to employ the reverse direction grant during at least a portion of the remainder of the allocated time period. The amount of time remaining within the allocated time period may be considered. Additionally or alternatively, the amount of data stored in buffers associated with the station that obtains the reverse direction grant that is to be transmitted may be considered as part of the evaluation. If it is determined that the reverse direction grant should be utilized, at 1010, data is transmitted to the station scheduled to be the transmitter in a second direction during the allocated time period. The second direction may be opposite to the first direction. Additionally or alternatively, the second direction may be from the station indicated to be the receiver to an access point. However, the aspects of the present disclosure are not limited to such illustrations.

It will be appreciated that, in accordance with one or more aspects described herein, inferences can be made regarding transmitting reverse direction grants, utilizing reverse direction grants to transmit data in a second direction, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding when to transmit a reverse direction grant, when to employ reverse direction grants to transmit data, etc. For instance, a reverse direction grant may be received while time remains in an allocated time period subsequent to a station transmitting data to a receiving station. Upon receiving a reverse direction grant at the receiving station, an inference may be made as to the whether the receiving station would be able to transmit all or some portion of data over the access channel prior to the end of the allocated time period. It will be appreciated that the foregoing examples are illustrative in nature and are not intended to limit the number of inferences that can be made or the manner in which such inferences are made in conjunction with the various embodiments and/or methods described herein.

Figure 11:
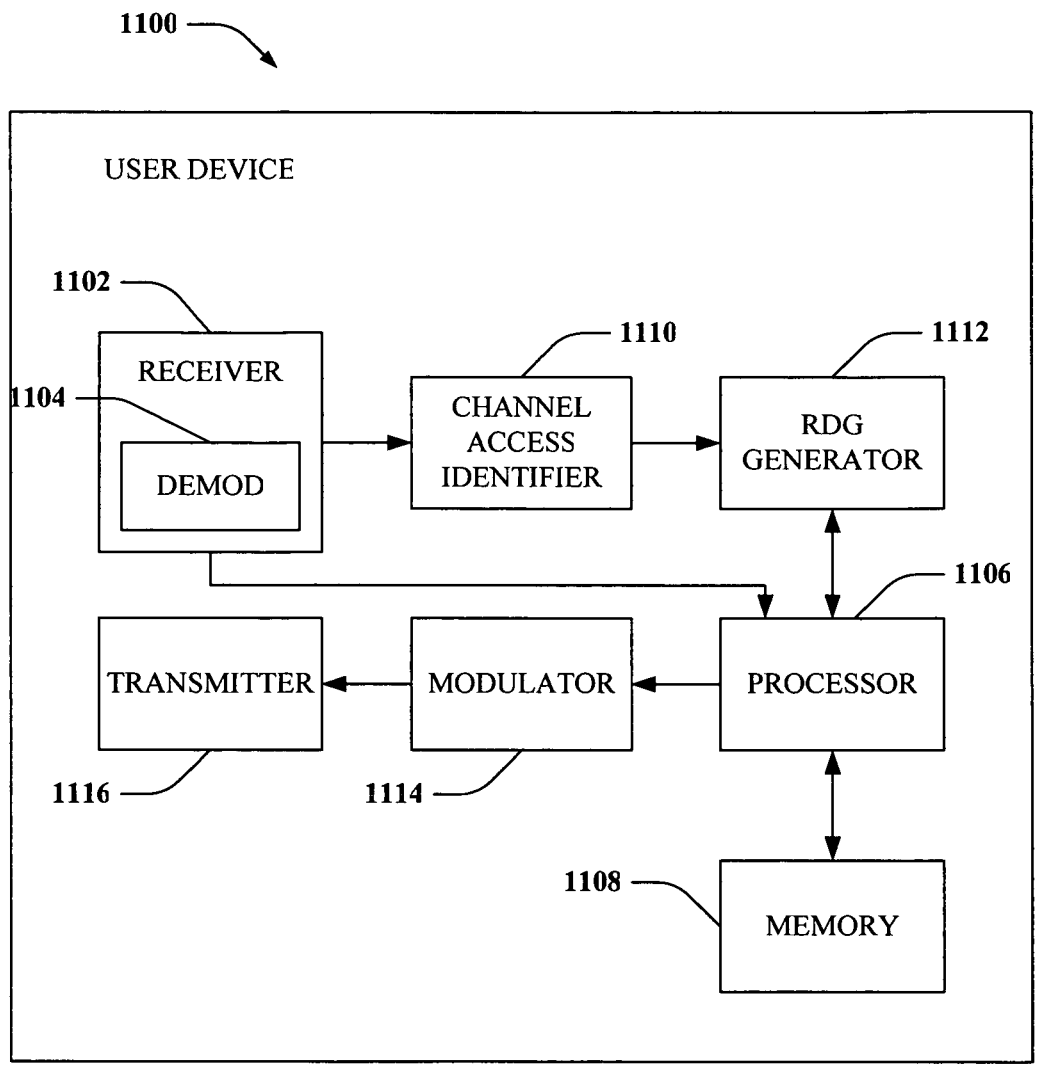
FIG. 11 is an illustration of user device that facilitates generating and/or utilizing a reverse direction grant in association with scheduled channel access periods in accordance with one or more aspects set forth herein.

FIG. 11 is an illustration of a user device 1100 that facilitates generating and/or utilizing a reverse direction grant in association with scheduled channel access periods in accordance with one or more aspects set forth herein. User device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of user device 1100, and/or a processor that both analyzes information received by receiver 1102, generates information for transmission by transmitter 1116, and controls one or more components of user device 1100.

User device 1100 can additionally comprise memory 1108 that is operatively coupled to processor 1106 and that stores information related to channel access schedules for various time periods, data to be transmitted via the transmitter 1116, multi-polls, and any other suitable information for mitigating communication channel waste in a wireless communication system as described with regard to various figures herein. Memory 1108 can additionally store protocols associated with providing and/or utilizing reverse direction grants (e.g., performance based, capacity based, . . . ), such that user device 1100 can employ stored protocols and/or algorithms related to generating and/or utilizing reverse direction grants to enable communication in a second direction during an allocated time period during which communication was to occur in a first direction as described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a channel access identifier 1110 that utilizes a received schedule (e.g., multi-poll frame, SCHED frame, . . . ) to determine a time at which user device 1100 is to receive and/or transmit data via a communication channel. The channel access identifier 1110 may also utilize a received reverse direction grant to enable the user device 1100 to transmit data via a communication channel. During times when user device 1100 is not scheduled to receive and/or transmit data, user device 1100 may be in sleep mode to reduce power consumption. Channel access identifier 1110 can be further coupled to a reverse direction grant (RDG) generator 1112 that may provide a reverse direction grant when user device 1100 completes a transmission during a scheduled time prior to the end of the allocated duration. The reverse direction grant may be utilized by a disparate apparatus to access the channel. For instance, the reverse direction grant may be employed by a station that is receiving data transmitted by user device 1100; the receiving station may then utilize the reverse direction grant to transmit data over the communication channel. User device 1100 still further comprises a modulator 1114 and a transmitter 1116 that transmits the signal to, for instance, an access point, another user device, etc. Although depicted as being separate from the processor 1106, it is to be appreciated that channel access identifier 1110, RDG generator 1112 and/or modulator 1114 may be part of processor 1106 or a number of processors (not shown).

Figure 12:
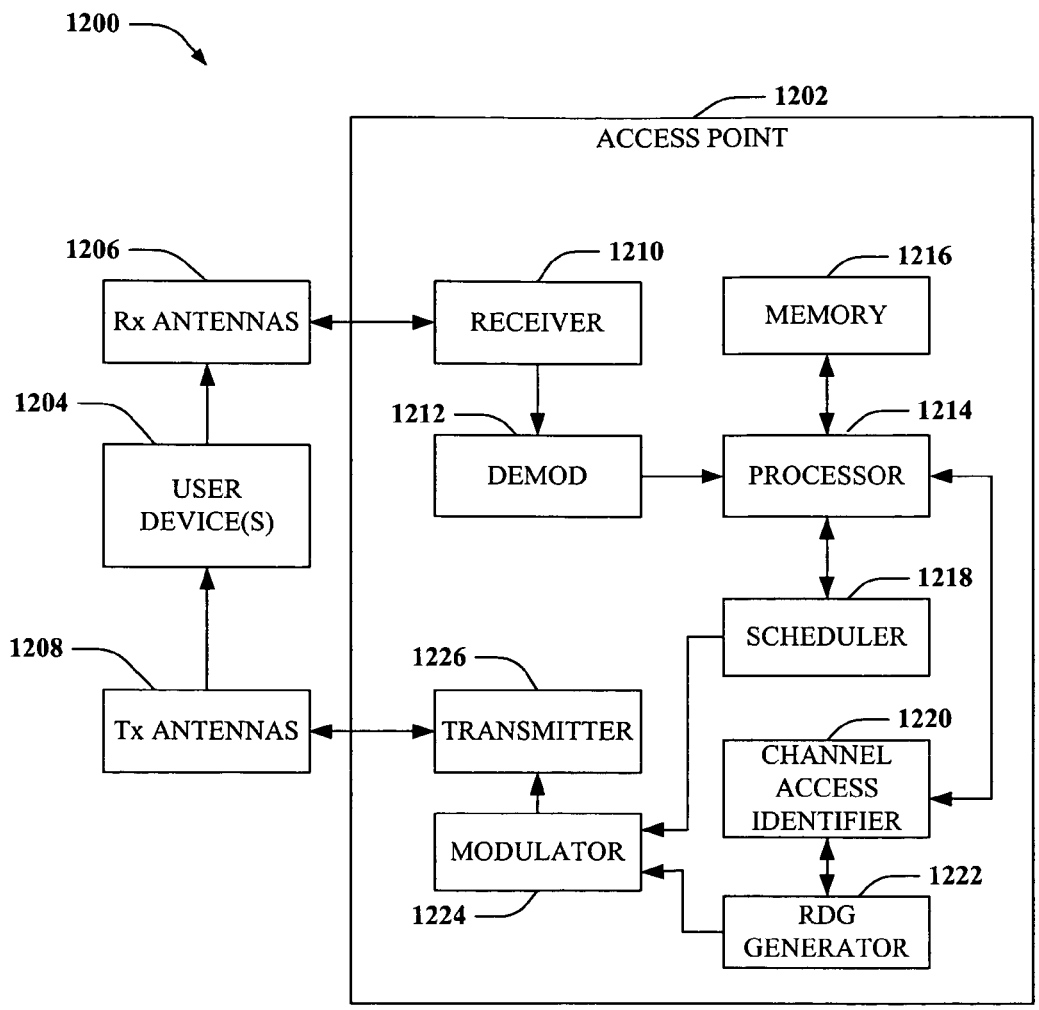
FIG. 12 is an illustration of a system that facilitates scheduling channel access and/or utilizing reverse direction grants to reduce channel bandwidth waste in a wireless communication system in accordance with various aspects.

FIG. 12 is an illustration of a system 1200 that facilitates scheduling channel access and/or utilizing reverse direction grants to reduce channel bandwidth waste in a wireless communication system in accordance with various aspects. System 1200 comprises an access point 1202 with a receiver 1210 that receives signal(s) from one or more user devices 1204 through a plurality of receive antennas 1206, and a transmitter 1224 that transmits to the one or more user devices 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related scheduling data, data to be transmitted to user device(s) 1204, and/or any other suitable information related to performing the various actions and functions set forth herein. Processor 1214 is further coupled to a scheduler 1218 that generates a schedule for channel access. For example, scheduler 1218 may generate a multi-poll that includes a number of polls, and each of the polls may indicate a start time for a particular transmission, a duration for the transmission, a particular station which transmits the data, and/or a particular station that receives the data. The scheduler 1218 may append information related to the schedule (e.g., multi-poll) to a signal generated by processor 1214 for transmission to user device(s) 1204. A modulator 1224 can multiplex the signal for transmission by a transmitter 1226 through transmit antenna 1208 to user device(s) 1204.

Additionally, processor 1214 may be coupled to a channel access identifier 1220 that determines times during which access point 1202 transmits and/or receives data via a communication channel. Channel access identifier 1220 may utilize the schedule (e.g., multi-poll frame, SCHED frame, . . . ) provided by scheduler 1218 to determine access times. Additionally or alternatively, channel access identifier 1220 may employ a received reverse direction grant to switch access point 1202 from a receiver during a current scheduled time period to a transmitter. Channel access identifier 1220 is further coupled to a reverse direction grant generator 1222 that evaluates whether to transmit a reverse direction grant when access point 1202 is transmitting data via a communication channel and finishes transmission prior to the completion of the allocated duration of time. If reverse direction grant generator 1222 identifies that a reverse direction grant should be provided, this information may be appended to a signal generated by processor 1214 for transmission to user device(s) 1204, may be multiplexed by modulator 1224, and may be transmitted via transmitter 1226. Although depicted as being separate from the processor 1214, it is to be appreciated that scheduler 1218, channel access identifier 1220, reverse direction grant generator 1222 and/or modulator 1224 may be part of processor 1214 or a number of processors (not shown).

Figure 13:
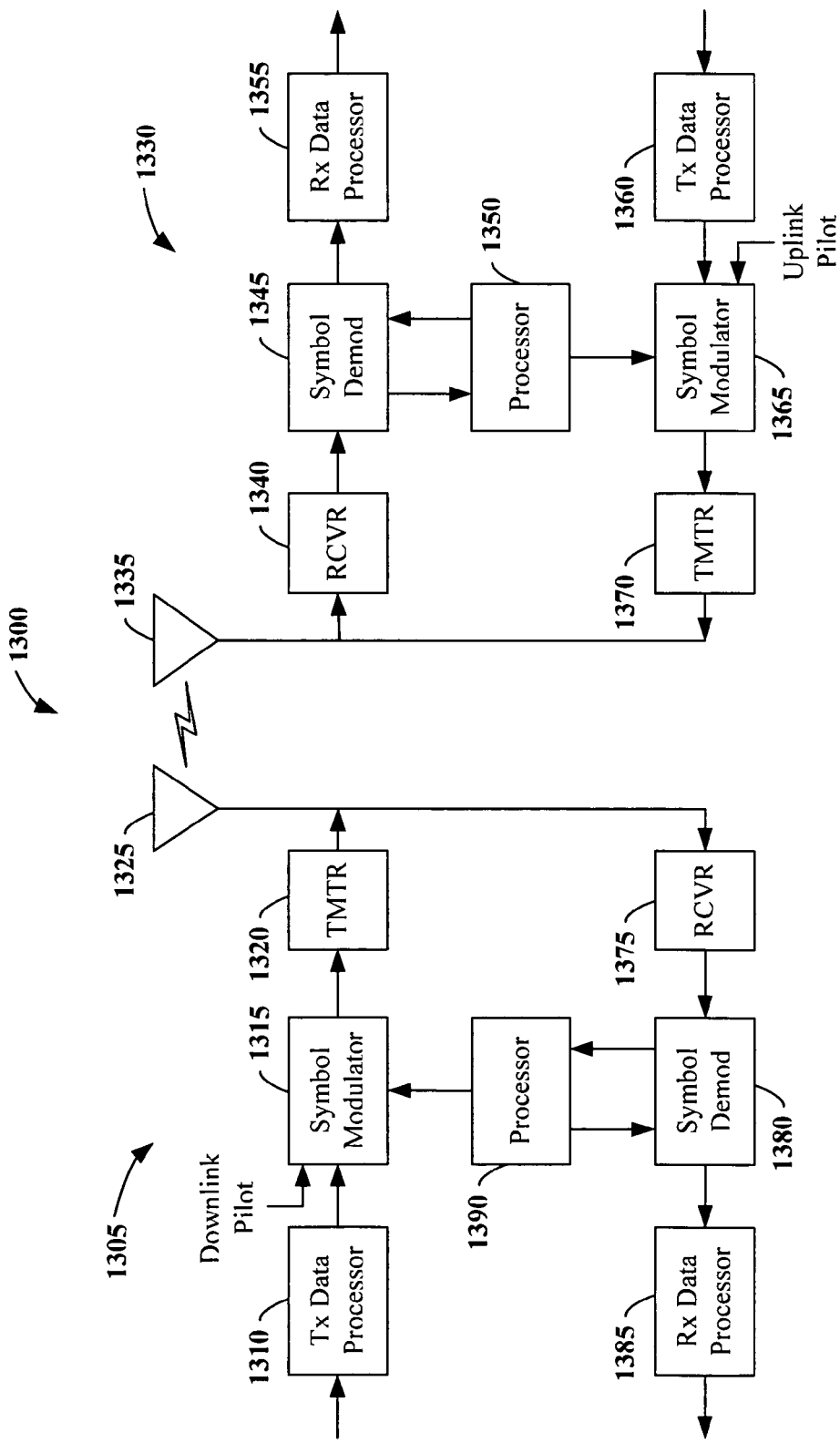
FIG. 13 is an illustration of a wireless network environment that can be employed in conjunction with the various systems and methods described herein.

FIG. 13 shows an exemplary wireless communication system 1300. The wireless communication system 1300 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the systems (FIGS. 1-2 and 11-12) and/or methods (FIGS. 8-10) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and provides them to a transmitter unit (TMTR) 1320. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1320 receives and converts the stream of symbols into one or more analog signals and further conditions (e.g., amplifies, filters, and frequency upconverts), the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.), operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, and many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, comprising:
receiving a multi-poll frame, at a recipient from an access point, that schedules transmissions for a number of time periods associated with transmission opportunities;
communicating data, to the access point from the recipient in a first direction, during a particular one of the scheduled time periods associated with a particular transmission opportunity according to the multi-poll frame;
transmitting a reverse direction grant, to the access point from the recipient in the first direction, during the particular scheduled time period associated with the particular transmission opportunity, the reverse direction grant enables the access point to transmit data in a second direction to the recipient using the particular scheduled time period associated with the particular transmission opportunity; and
receiving data, from the access point, in the second direction during the particular scheduled time period associated with the particular transmission opportunity wherein the first direction is opposite the second direction.

2. The method of claim 1, further comprising evaluating whether to transmit the reverse direction grant.

3. The method of claim 2, further comprising determining an amount of time remaining in the particular scheduled time period associated with the particular transmission opportunity.

4. The method of claim 2, further comprising determining whether a station indicated to be a transmitter in the multi-poll frame completed an associated transmission.

5. The method of claim 1, further comprising evaluating whether to employ a received reverse direction grant during at least a portion of a remainder of the particular scheduled time period associated with the particular transmission opportunity.

6. The method of claim 5, further comprising evaluating at least one of an amount of time remaining in the particular scheduled time period and an amount of data to be transmitted in the second direction upon obtaining channel access.

7. The method of claim 1, further comprising generating the multi-poll frame which is a frame that indicates, for each of the number of time periods, information associated with a respective, corresponding transmission opportunity, the information includes at least one of an identity of a transmitting station, an identity of a receiving station, a start time, and a duration.

8. The method of claim 1, the multi-poll frame is a SCHED frame.

9. An apparatus that facilitates utilizing a reverse direction grant in a wireless communication system, the apparatus comprising:
a memory that stores information associated with at least one transmission opportunity related to access of a channel, the information received in a multi-poll frame from an access point, the multi-poll frame configured to schedule transmissions for a number of time periods associated with transmission opportunities; and
a processor, coupled to the memory, that is configured to: communicate data, to the access point in a first direction, during a particular one of the scheduled time periods associated with a particular transmission opportunity assigned to the apparatus according to the multi-poll frame;
transmit a reverse direction grant, in the first direction to the access point, during the particular scheduled time period associated with the particular transmission opportunity the reverse direction grant configured to enable the access point to transmit data in a second direction to the apparatus using the particular scheduled time period associated with the particular transmission opportunity, and
receive data, from the access point, in the second direction during the particular scheduled time period associated with the particular transmission opportunity, wherein the first direction is opposite the second direction.

10. A wireless communication apparatus, comprising:
means for receiving a multi-poll frame, from an access point, that schedules transmissions for a number of time periods associated with transmission opportunities;
means for communicating data in a first direction during a particular one of the scheduled time periods associated with a particular transmission opportunity to the access point according to the multi-poll frame;
means for transmitting a reverse direction grant in the first direction to the access point during the particular scheduled time period associated with the particular transmission opportunity, the reverse direction grant enables the access point to transmit data in a second direction to the apparatus using the particular scheduled time period associated with the particular transmission opportunity; and
means for receiving data in the second direction from the access point during the particular scheduled time period associated with the particular transmission opportunity after the reverse direction grant has been received by the access point, wherein the first direction is opposite the second direction.

11. A non-transitory computer-readable medium having stored thereon computer-executable instructions for:
receiving a multi-poll frame, at a recipient from an access point, that schedules transmissions for a number of time periods associated with transmission opportunities;
communicating data in a first direction to the access point during a particular one of the scheduled time periods associated with a particular transmission opportunity according to the multi-poll frame;
transmitting the reverse direction grant in the first direction to the access point during the particular scheduled time period associated with the particular transmission opportunity, the reverse direction grant enables the access point to transmit data in a second direction to the recipient using the particular scheduled time period associated with the particular transmission opportunity; and
receiving data from the access point in the second direction during the particular scheduled time period associated with the particular transmission opportunity after the reverse direction grant has been received by the access point, wherein the first direction is opposite the second direction.

12. The apparatus of claim 9, wherein the processor is further configured to evaluate whether to transmit the reverse direction grant.

13. The apparatus of claim 12, wherein the processor is further configured to determine an amount of time remaining in the particular scheduled time period associated with the particular transmission opportunity.

14. The apparatus of claim 9, wherein the multi-poll frame comprises a frame that indicates, for each of a number of time periods, information associated with a respective, corresponding transmission opportunity, the information includes at least one of an identity of a transmitting station, an identity of a receiving station, a start time, and a duration.

15. The wireless communication apparatus of claim 10, further comprising:
   means for evaluating whether to transmit the reverse direction grant.

16. The wireless communication apparatus of claim 15, further comprising:
   means for determining an amount of time remaining in the particular scheduled time period associated with the particular transmission opportunity.

17. The wireless communication apparatus of claim 10, wherein the multi-poll frame comprises a frame that indicates, for each of a number of time periods, information associated with a respective, corresponding transmission opportunity, the information includes at least one of an identity of a transmitting station, an identity of a receiving station, a start time, and a duration.

18. The computer-readable medium of claim 11, further comprising computer instructions for evaluating whether to transmit the reverse direction grant.

19. The computer-readable medium of claim 18, further comprising computer instructions for determining an amount of time remaining in the particular scheduled time period associated with the particular transmission opportunity.

20. The computer-readable medium of claim 11, wherein the multi-poll frame comprises a frame that indicates, for each of the number of time periods, information associated with a respective, corresponding transmission opportunity, the information includes at least one of an identity of a transmitting station, an identity of a receiving station, a start time, and a duration.

* * * * *